United States Patent
Chesneau et al.

(10) Patent No.: US 11,653,673 B2
(45) Date of Patent: May 23, 2023

(54) METHOD FOR TREATING FLAX SEEDS WITH A VIEW TO IMPROVING THE FOOD VALUE OF SAME

(71) Applicant: VALOREX, Combourtille (FR)

(72) Inventors: Guillaume Chesneau, Luitre (FR); Mathieu Guillevic, Rennes (FR); Antoine Germain, Cesson Sevigne (FR); Hervé Juin, Péré (FR); Michel Lessire, Nouzilly (FR); Francis Enjalbert, Tournefeuille (FR); Christine Burel, Ahetze (FR); Anne Ferlay, Chamaliere (FR)

(73) Assignee: Valorex, Combourtillé (FR)

( * ) Notice: Subject to any disclaimer, the term of this patent is extended or adjusted under 35 U.S.C. 154(b) by 0 days.

(21) Appl. No.: 16/766,131

(22) PCT Filed: Nov. 20, 2018

(86) PCT No.: PCT/EP2018/081971
§ 371 (c)(1),
(2) Date: May 21, 2020

(87) PCT Pub. No.: WO2019/101751
PCT Pub. Date: May 31, 2019

(65) Prior Publication Data
US 2020/0359651 A1 Nov. 19, 2020

(30) Foreign Application Priority Data

Nov. 21, 2017 (FR) ...................................... 1760984

(51) Int. Cl.
| | |
|---|---|
| *A23K 10/14* | (2016.01) |
| *A23K 20/158* | (2016.01) |
| *A23K 10/30* | (2016.01) |
| *A23K 50/10* | (2016.01) |
| *A23K 50/30* | (2016.01) |
| *A23K 50/75* | (2016.01) |

(52) U.S. Cl.
CPC .............. *A23K 10/14* (2016.05); *A23K 10/30* (2016.05); *A23K 20/158* (2016.05); *A23K 50/10* (2016.05); *A23K 50/30* (2016.05); *A23K 50/75* (2016.05)

(58) Field of Classification Search
CPC ............ A23V 2002/00; A23V 2250/21; A23L 33/105; A23L 33/115; A23L 25/30; A23L 29/065; A23L 33/12; A23L 5/00; A61K 2236/30; A61K 36/55; A23K 10/14; A23K 20/158; A23K 10/30; A23K 50/10; A23K 50/30; A23K 50/75
See application file for complete search history.

(56) References Cited

U.S. PATENT DOCUMENTS

2005/0136162 A1* 6/2005 Kvist .................. A23J 1/14
426/455

FOREIGN PATENT DOCUMENTS

EP 1106078 A1 6/2001

OTHER PUBLICATIONS

Vanvolsem Thibaut, EP1106078, English Machine Translation, Jun. 13, 2001. (Year: 2001).*
Imran, Muhammad, Faqir M. Anjum, Masood S. Butt, Muhammad Siddiq and Munir A. Sheikh, Reduction of Cyanogenic Compounds in Flaxseed (*Linum uitatissiumum* L.) Meal Using Thermal Treatment, International Journal of Food Properties, 16:8, 1809-1818. (Year: 2013).*
Ospanov, Abdymanap A, Nurzhan Zh. Muslimov, Aigul K. Timurbekova, Gulnara B. Jumabekova, Effect of Humidity of Poly-Cereal Flour Mixture and Screw Rotation Rate of Efficiecny of Extrusion Process, International Journal of Environmental & Science Education. 2016, vol. 11, No. 17, 10155-10162. (Year: 2016).*
Healtline, Why Green Peas are Healthy and Nutritious, Feb. 24, 2017, retrieved online Aug. 11, 2021. https://www.healthline.com/nutrition/green-peas-are-healthy#TOC_TITLE_HDR_2 (Year: 2017).*
Goyal, Ankit, Vivek Sharma, Neelam Upadhyay, Sandeep Gill and Manvesh Sihag, Flax and Falxseed Oil: An Ancient Medicine & Modern Functional Food, J Food Sci Technol (Sep. 2014) 51(9):1633-1653, (Year: 2014).*
Bekhit et al. Flaxseed: Composition, detofication, utilitzation, and opportunities, Biocatalysis and Argricultural Biotechnology 13 (2018) 129-152. available online Dec. 5, 2017. (Year: 2017).*

(Continued)

*Primary Examiner* — Hong T Yoo
(74) *Attorney, Agent, or Firm* — Panitch Schwarze Belisario & Nadel LLP; Erin M. Dunston

(57) ABSTRACT

The present invention relates to a process for treating flax (*Linum usitatissimum*) seeds with a view to improving their use as food, in particular for animals, characterized in that it comprises the following successive steps:
  a) Use of flax seeds provided that these seeds have a fat and/or omega-3 fatty acid content in excess of predefined values;
  and, only when the seeds are intended for feeding monogastric animals, a value for water retention capacity or a nutritional component of low value below predetermined values.
  b) Mixing, where there are at least two raw materials of different nature and/or quality and then fractionating, or fractionating and then mixing, said seeds from step a);
  c) Implementing a thermal step of preparation of the seeds from step b) with steam and/or a water-based liquid;
  d) Pressurizing the seed or mixture from step c) to a minimum pressure of 10 bars;
  and/or
  d1) Heating the seeds or the mixture from step d) or c) respectively.

19 Claims, No Drawings

(56) References Cited

OTHER PUBLICATIONS

Akande et al., "Major Antinutrients Found in Plant Protein Sources: Their Effect on Nutrition", 9(8), Pakistan Journal of Nutrition, 827-832, (2010).

Bedford, "Mechanism of action and potential environmental benefits from the use of feed enzymes", 53, Animal Feed Science and Technology, 145-155, (1995).

Choct et al., "Increased small intestine fermentation is partly responsible for the anti-nutritive activity of non-starch polysaccharides in chickens" 37, British Poultry Science, 609-621, (1996).

Elboutachfaiti et al., "Fractionation and structural characterization of six purified rhamnogalacturonans type I from flaxseed mucilage", 62, Food Hydrocolloids, 273-279, (2017).

Feng et al., "Effectiveness of different processing methods in reducing hydrogen cyanide content of flaxseed", 83, Journal of the Science of Food and Argiculture, 836-841, (2003).

Hylemon, "Metabolism of bile acids in intestinal microflora", Sterols and Bile Acids, Chapter 12, 331-343, (1985).

Ikeda et al., "In Vitro Inhibition of Digestive Enzymes by Indigestible Polysaccharides", 60(4),Cereal Chem., 260-263, (1983).

Longstaff et al., "The inhibitory effects of hull polysaccharides and tannins of field beans (*Vicia faba* L.) on the digestion of amino acids, starch and lipid and on digestive enzyme activites in young chicks", 65, Britsh Journal of Nutrition, 199-216, (1991).

Noblet et al., "Energy Value of linseed in pigs: impact of extrusion techonlogy", 40, Journees Recherche Porcine, 203-208, (2008).

Oomah et al, "Fractionation of flaxseed with a batch dehuller", 9, Industrial Crops and Products, 19-27, (1998).

Oomah et al. "Effect of Dehulling on Chemical Composition and Physical Properties of Flaxseed", 30, Lebensm Wiss U Technol., 135-140, (1997).

Oomah et al., "Dehulling Characteristics of Flaxseed", 29, Lebensm Wiss U Technol., 245-250, (1996).

Wu et al., "An efficient fermentation method for the degradation of cyanogenic glycosides in flaxseed", 29(7), Food Additives & Contaminants, 1085-1091, (Jul. 2012).

Yamashita et al., "Development of a method to remove cyanogen glycosides from flaxseed meal", 42, International Journal of Food Science and Technology, 70-75, (2007).

Afnor et al., "Aliments pour animax, Dosage de l'acide cyanhydrique par CLHP", NF EN 16160, 20 pages, (2012).

Chesneau et al., "Quality of treatment of oleaginous seeds by cooked-extrusion: available fat", 16, Renc. Rech. Ruminants, 62 (2009).

Legrand et al., "Lipides" Apports Nutritionnels Conseilles, 63-82, (2001).

Meynard et al., "La diversification des cultures: lever les obstacles agronomiques et economiques", ResearchGate, 105 pages, (2014).

* cited by examiner

METHOD FOR TREATING FLAX SEEDS WITH A VIEW TO IMPROVING THE FOOD VALUE OF SAME

CROSS-REFERENCE TO RELATED APPLICATIONS

This application is a U.S. National Stage Application pursuant to 35 U.S.C. § 371 of International Patent Application PCT/EP2018/081971, filed on Nov. 20, 2018, and published as WO 2019/101751 on May 31, 2019, which claims priority to French Patent Application 1760984, filed on Nov. 21, 2017, all of which are incorporated herein by reference in their entireties for all purposes.

FIELD OF THE INVENTION

The present invention relates to a process for treating flax seeds to improve their use as food, in particular for animals.

BACKGROUND OF THE INVENTION

In human nutrition, it is a fact that the fat consumption of the French population is now quantitatively in line with the recommended nutritional intake, but it remains qualitatively unbalanced, particularly in terms of essential fatty acids (FA) (omega-3 fatty acids). Indeed, the consumption of α-linolenic acid (ALA) is on average only 0.8 g per person per day, whereas the recommendation issued by Anses in 2010 is 2 g. At the same time, the consumption of linoleic acid (LA) being approximately at the level of the recommended nutritional intake, this results in an excessive LA/ALA ratio.

In order to ensure an optimal supply of essential FA to the consumer, it is possible to influence the choice of foods that make up our daily meals. However, it is also possible to choose feedstuffs that have themselves been modified in the way in which the animals are produced.

Indeed, it is now well known that when animals ingest more ALA, more of it is found in products such as meat, eggs or dairy products. Thus, an important issue is to provide animals with digestible, effective and safe sources of ALA. The animal will then use the ALA ingested to deposit it in its tissues or metabolize it into different cellular mediators playing a role in the immune, inflammatory and reproductive systems for example.

Omega-3s are said to be essential and indispensable because animals, including man, cannot synthesize them. He must therefore necessarily find them in his diet for his own metabolic balance and health. Therefore, what is described below for animals is also true for man. In the lines below and the claims, it must be understood that man is part of the monogastric mammalian animals, as are dogs and cats.

I. Context of the Present Invention

A. Expectations in the Supply Chains

Since the release of the "Recommended Nutritional Intakes" published by ANSES (formerly AFSSA) in 2001, expressing the essential nature of omega-3 FAs, and in particular ALA, for our physiological needs but also their too low consumption, 1) many dieticians, doctors and other prescribers of a healthy and balanced diet have spread this message to consumers;

2) numerous scientific studies have also shown the effect of the choice of dietary FAs in the animal ration on the quality of the lipid profile of animal-derived products.

Each link in the food chain expresses expectations that can be summarized as follows:

Farmers: look for crop rotation heads to lengthen crop rotations and thus limit the pressure of diseases and pests, facilitate weed control, reduce the use of nitrogen fertilizers to ultimately make their production system more robust;

Breeders: optimize the performance of their production tools, by having an optimal utilization of the ration, productive and healthy animals, but also take more advantage of their products by seeking to give them added value. This is the case, for example, with official quality signs such as organic farming, the red label, AOP, AOC, or even chains such as the "Bleu-Blanc-Cœur" chain (registered trademark) which promotes products with a better nutritional profile through, for example, specific specifications.

Consumers: consume safe, healthy, natural food with low GMO use, close to production areas, and with proven nutritional and health benefits, all within the concept of sustainable food.

But there are others, of great influence, expressed by:

Institutions that want to limit the use of oilseed imports, nitrogen fertilizers and pesticides, and increase French and European production of crops of interest;

Firms throughout the food chain, looking for differentiation and added value in a tense economic context;

Para-agricultural companies that make up a wide network of services and products.

B. The Potential of an Integrated Solution: Flaxseed

While this solution potentially meets all the expectations of the sectors, it can nevertheless be limiting on certain points.

First, the interest potential of flaxseed is outlined below. Then its limitations will be described.

1. A Solution for Crops

The integration of flax into crop rotations is advantageous from an agronomic point of view, both in conventional and organic systems, and for both a winter and spring seeding strategy.

This culture contributes to diversify rotations and lengthen them;

reduce the use of inputs: nitrogen fertilizers, plant protection products, potash, phosphorus, etc.

increase the yield of the following crops through diversification and the structuring effect of roots at soil level.

2. A Solution for Food

Monogastric animals, such as broiler and laying fowl, or pigs for slaughter have, by definition, a single stomach. Due to their digestive physiology, there is a very good relationship between the omega-3 fatty acids ingested and those deposited in products intended for human consumption (Lessire 2001).

As for ruminants or polygastric animals, they have the particularity of having four stomachs, one of which is called the rumen. This one has the capacity to biohydrogenate a good part of the omega-3 fatty acids, i.e. the omega-3 will be saturated and isomerized in other saturated or unsaturated fatty acids.

Fortunately, ruminants are naturally heavy consumers of omega-3, since they are found in large quantities in the grass, which allows them to find enough of it when they leave the rumen, and thus, part of the omega-3 will also be able to be fixed in the tissues and also serve the different metabolisms of interest for the health of the animal.

But omega-3 hydrolyzed and then degraded in the rumen into a large number of different FAs will also have an advantageous effect on the rumen bacterial population, notably by reducing protozoa and promoting the cellulolytic flora. This will have two very advantageous consequences: the synthesis of acetic acid, which produces hydrogen, will be reduced and that of propionic acid, which consumes hydrogen, will increase, leading on the one hand to a reduction in the de novo synthesis of saturated FAs present in milk or meat and, on the other hand, a reduction in enteric methane emissions into the environment.

Thus, the objective is not necessarily to completely protect the omega-3s from ruminal degradation, but to find the right balance, as is possible with a grass-based diet.

Whether ruminants or monogastric animals, their diet is deficient in AGPIn-3 (massive use of soybean and maize sources of omega-6 in animal feed, reduction in the use of grass for ruminants). However, their metabolism needs omega-3 in the form of alpha-linolenic acid (ALA). Although certain raw materials can contribute to its intake (grass, alfalfa, rapeseed), it is however not possible to provide the quantities without using a more concentrated source of omega-3.

From this perspective, flaxseed is a leader in terms of its lipid content and its fatty acid profile similar to that of grass, with approximately 55% of the fatty acids in the form of ALA.

Flax seeds are therefore an important source of energy, in the form of lipids, and omega-3 fatty acids, whose known nutritional and health benefits in humans are applicable to some extent to animal nutrition and health.

a) Nutritional Values

The nutritional values of flaxseed according to INRA food tables are presented in the table below, compared with rapeseed.

|  | FLAX seed | RAPE seed |
|---|---|---|
| Dry matter (%) | 90.3 | 92.2 |
| Crude protein (%) | 22.6 | 19.1 |
| Raw fat (%) | 32.7 | 42.0 |
| Raw cellulose (%) | 9.2 | 8.2 |
| NDF | 22.1 | 17.6 |
| Crude ash (%) | 4.3 | 4.0 |
| Sugars (%) | 3.4 | 5.1 |
| Oleic acid (% of total FA) | 18.7 | 58.0 |
| Linoleic acid (% of total FA) | 14.7 | 20.5 |
| α-Linolenic acid (% of total FA) | 54.2 | 9.8 |
| Gross energy (kcal/kg) | 5780 | 6310 |
| Digestible energy, pig (kcal/kg) | 4190 | 5230 |
| Digestible energy, pig/Gross energy | 72% | 83% |
| Metabolizable energy, rooster (kcal/kg) | 3390 | 4410 |
| Metabolizable energy, rooster/Raw energy | 59% | 70% |
| Metabolizable energy, ruminant (kcal/kg) | 3870 | 4470 |
| Metabolizable energy, ruminant/Raw energy | 67% | 71% |

(Source: Table de composition et de valeur nutritive des matières premières destinées aux animaux d'élevage, INRA, 2002)

We can thus see that flaxseed is less rich in lipids and energy than rapeseed, and that this energy is less well valued by pigs, roosters and ruminants. In fact, on the basis of the gross energy contained in flax seeds, pigs, roosters and ruminants use only 72% of this energy in the form of energy digestible by pigs, 59% in the form of energy metabolizable by roosters and 67% for ruminants, compared with 83%, 70% and 71% respectively for rapeseed. It should be added that rapeseed must undergo technological treatments to reach the above values (Leclercq et al., 1989).

Thus, if flax seeds have an advantageous nutritional potential, they remain insufficiently utilized, in nutritional terms, by the various animal species, as indicated by the low values in digestible and metabolizable energy in particular.

Another way to assess flaxseed digestibility is to measure fat availability. Most of the energy contained in the seed is in the form of fat. And as will be seen below, one limit to digestibility is the low availability of fat in the seed. Hence the interest of trying to evaluate this digestibility usually measured in vivo, in dedicated experimental farms, by an in vitro measurement of the availability of the fat of the seed.

Thus, depending on the treatments applied to the seed, a simple measure of available fat (AF) can be used to compare treatments and predict digestibility, as shown in the articles by Noblet et al. (2008) on pigs and Chesneau et al. (2009) on ruminants.

b) Measurement of Available Fat (AF)

This internal method is based on the evaluation of the proportion of fat extracted in a solvent after a predetermined time. The purpose of this assay is to mimic the gradual and stepwise release of fat into the different compartments of the animals' digestive tract.

Briefly, the assay is carried out in four steps:

Preparation of the raw material: it consists of a coarse grinding in order to obtain a heterogeneous granulometry as in the case of the grinding carried out in the animal feed industry;

Extraction of the fat: It consists in bringing the pre-weighed raw material into contact with an extraction solvent (e.g. petroleum ether) under controlled stirring for a predetermined period of time, in this case 10 minutes. It is also possible to carry out this extraction phase for different durations, thus making it possible to deliver a release kinetics of the fat.

Solid/liquid separation by filtration: This consists of filtering the ground material dissolved in the solvent in order to recover only the liquid phase in a dry and previously tared round-bottom flask.

Removal of the solvent from the extract and weighing of the dry residue: It consists of evaporation of the solvent that has solubilized the fat. Once evaporated, dried and cooled, the flask will be weighed. This cycle is repeated until a constant mass is obtained.

Thus, it is possible to characterize the seeds through the AF, the values of which are dependent on the operating conditions set.

This released fat, known as available because it is quickly accessible, will be absorbed through the intestinal wall. Thus absorbed, it can be used by the animal for its own metabolism.

3. A Significant Presence of Antinutritional Factors

Beyond their low digestibility values, flax seeds contain antinutritional factors that may limit their use. These antinutritional factors are mainly cyanogenic compounds and total fiber, including soluble fiber in the form of mucilage.

Their presence results in limits to their incorporation in food and technical poor performances that can be summarized as a real difficulty of competitiveness of flax seeds vis-à-vis other sources of energy and fat, especially in monogastric species.

The main antinutritional factors reported are as follows:

Cyanogenic Compounds

Flaxseed is characterized by its high content of cyanogenic compounds (5 g/kg of seed on average). However, this content varies according to soil and climatic conditions and flax varieties. Two diglucosides make up the bulk of the forms present in mature flaxseed: linustatin (2 to 4 g/kg of seed) and neolinustatin (1 to 2 g/kg of seed), derived from two monoglucoside precursors. Under the action of an enzyme present in the seed, but also in animals or humans, namely β-glucosidase, cyanogenic compounds release hydrocyanic acid (HCN), which is highly volatile and highly diffusible.

Ingested hydrocyanic acid diffuses rapidly into the body. The cyanide ion it contains is a potent cellular poison inhibiting at least 40 different enzymes including cytochrome oxidase, which is used to transport electrons in the respiratory chain to form ATP molecules.

In other words, HCN has the same effect as a total absence of oxygen because it cannot be used. It blocks the respiratory chain and, in high doses, inevitably leads to death.

Indeed, in animals and humans, although there are defense mechanisms that allow the evacuation of HCN produced at low doses through partial elimination of HCN absorbed through the lungs (due to its extreme volatility), some of this HCN, which can become significant during higher absorption, is metabolized by several pathways:

- The main detoxification route is the transformation of HCN into thiocyanates by the action of transulfurase or rhodanese. The thiocyanates thus produced in the liver, spleen, adrenals, pancreas, thyroid and kidneys are eliminated through urine, saliva and sweat.
- Other, more ancillary routes allow its elimination through the urine or through the lungs after hydrolysis and oxidation.

Thus, a high consumption of flax seeds in humans (50 g/day) revealed an increase in the level of thiocyanates in the urine, however not significant, but coupled with an excretion of creatinine multiplied by 3 (p<0.01) indicating renal dysfunction.

This is an illustration of the damage that can be caused by consuming undetoxified flax seeds, and also of the energy that becomes both limited due to the blocking mechanism of the respiratory chain and necessary for the body to detoxify the diffusion of HCN in the body.

To date, the method for determining cyanogenic compounds consists of an indirect method for assaying HCN after adding β-glucosidase according to the standard analysis method EN 16160 of April 2012. It thus expresses the HCN content in mg per kg of seed.

Mucilages a) Description

Mucilages from flaxseed are present in the seed coat. They are water-soluble non-starchy polysaccharides.

Flax seeds contain large amounts of mucilages that increase the viscosity of the intestinal contents. They account for up to about 8% of the total weight of flax seeds. Mucilages are characterized by a high water-retention capacity.

There is a large body of scientific literature indicating that these mucilages can have a deleterious effect on digestive health and the processes engaged by the animal during the transit of food and are explained below.

It is hypothesized that increased intestinal viscosity decreases nutrient digestibility by interfering with the diffusion of digestive enzymes to their substrates and the movement of digestate through the intestinal lumen (Fengler and Marquardt, 1978, Longstaff and McNab, 1991).

Viscous polysaccharides may also complex directly with digestive enzymes and decrease their activity (Ikeda and Kusano, 1983).

In addition, with the increased flow of undigested nutrients, microbial activity is stimulated in the lower gut, which would result in greater competition for nutrients with the host animal (Bedford, 1995; Choct et al., 1996).

Among the available nutrients, fat digestibility may be particularly affected, as some species of microbes are able to deconjugate bile acids and alter micelle formation, thereby reducing fat digestion (Hymetond, 1985).

b) Evaluation Methods

Mucilages are complex compounds to be assayed, which explains why several methods are described in the bibliography, leading to a high variability of assay results, and generally developed in research laboratories. The method described by Elboutachfaiti et al. 2017 and used as a reference is based on an extraction of total mucilages as described:

Water-soluble polysaccharides are extracted from the seeds by stirring in distilled water. The filtered mucilage is then collected and centrifuged to remove insoluble particles. The supernatant is purified by tangential ultrafiltration against distilled water. Finally, the retentate solution is freeze-dried to obtain the flaxseed mucilage.

In view of the poor accessibility of this mucilage determination method, linked to its high cost and long analysis time, an alternative method that is simpler and quicker to implement is to assess the water retention capacity of flax seeds. Indeed, mucilages have the strong property of retaining water in large quantities. Thus, it becomes easier to measure indirectly the mucilages or more precisely the effects of the mucilages, known for their viscosity.

The method for assessing the water retention capacity (WRC) of flax seeds, developed in-house, consists of quantifying the volume of water retained by the seeds as they are. This retained water corresponds to the volume of water that does not flow under the action of gravity. It is therefore the total amount of water retained by soluble dietary fibers such as the non-starch polysaccharides of the seed, whose value remains dependent on the operating conditions set and whose affinity with water is important.

Briefly, the determination of the water retention capacity is carried out on the basis of 10 g of seed(s) (P.MP), previously coarsely crushed, having been previously saturated with water (80 g of water at room temperature, P.water) for a period of 1 hour. At the end of this period of saturation of the seed(s) in water, the free water of the mixture is allowed to flow for a period of 10 minutes through a strainer (1 mm screen). This free water is then weighed (P. free.water). When the free flow stops, the seed mixture is said to be at the retention capacity (RC). The CRE (g/g MS) is expressed according to the formula: P.water–P.free water]/P.MP, then reduced to the dry matter of the seed, according to the expression below:

$$RC\left(\frac{g}{g\ MS}\right) = \frac{P.water - (Pf - Pi)}{\frac{100 - Moisture}{100} * P.MP}$$

The water retention capacity thus quantified provides a predictive criterion for the effect of mucilages that can interfere both in the industrial processing of flax seeds and in the digestion process of animals.

Fiber

Monogastric animals in general are not well equipped in terms of the digestive capacity of the fiber in their diet. Flax seeds are relatively well endowed with 9.2% crude cellulose and 22.1% neutral detergent fiber (NDF) according to INRA.

This fiber therefore also represents a category of antinutritional factors that it is important to highlight, particularly in young monogastric livestock such as chickens, piglets and fish, but also for young pets such as dogs and cats.

Not only does this fiber have a low digestibility, but it also provides less digestibility of protein and other nutrients, as it acts as a "bulwark" for the animals' digestive enzymes by limiting their accessibility, and as a role of congestion in the gut limiting the uptake of nutrients.

In Summary

While flax seeds have the potential to improve animal and human health parameters, or to improve the nutritional quality of livestock products, it has been shown above that this potential is strongly limited by:

The low raw digestibility of flaxseed and its omega-3 FAs, due to the presence of a complex pectocellulose wall surrounding the flax seed. These components are therefore, on the one hand, poorly accessible and poorly digested by the monogastric animal and, on the other hand, poorly released and poorly hydrolyzed in the rumen of ruminants. In addition, more specifically for monogastric animals, other nutritional components intrinsic to the seed such as fiber are poorly valued by the animal.

The presence of antinutritional factors such as cyanogenic compounds, mucilages and fibers, which are naturally present in the seed in its raw state as a natural defense mechanism of the seed against its aggressors.

In flaxseed, it is mainly cyanogenic compounds that are found, but mention may also be made of fibers and more particularly soluble fibers such as mucilages given their water retention capacity and their high viscosity power impacting the digestive process of young animals.

The challenge is therefore to best express the potential of flaxseed by promoting its nutritional and metabolic value while limiting the antinutritional factors.

Technical Problem to be Solved

A. Insertion of Flax Seeds: Approaches and Limits

The use of flax seeds in feed is currently present, but relatively undeveloped due to technical and economic barriers.

From a technical point of view, the challenge is to reduce the antinutritional factors and improve the nutrient digestibility values (energy, protein, fat, etc.) of seeds, and thus improve the benefit/risk ratio linked on the one hand to the intake of omega-3, and on the other hand to that of HCN and other fibers, which are not easily digestible.

From an economic point of view, because the technical characteristics obtained are still insufficient, the use of flaxseed in animal feed is not developed and only exists in rare situations where farmers benefit from better results in terms of animal health and/or better prices on the products they sell because of a better nutritional composition.

The challenge today is therefore to make the use of flaxseed economically viable.

There are two main approaches for greater use of flax seeds in food: plant breeding and especially the technological processes of seed treatment.

i. Varietal Selection

The selection of oil producing flaxseed is based on mainly agronomic criteria, i.e. yield, earliness, lodging resistance, etc. It is also based on criteria related to seed use, and to date the seed quality criteria used in breeding programs are relative:

to the oil content of the seed and its extractability, for crushers seeking to increase oil separation yields from the cake, and to another extent;

the oil content of the seed and the proportion of omega-3 in this oil, for companies that will seek to increase the proportion of omega-3 per kg of flaxseed and gain in competitiveness.

But until now, varietal selection on oilseed flax has not paid much attention to antinutritional factors to the point of marketing specific varieties with reduced levels of cyanogenic compounds or mucilages. Neither has it been interested in making omega-3s more digestible or available.

This is why it can be considered that the genetic approach has not yet proved its effectiveness in terms of improving the benefit/risk ratio between the amount of digestible omega-3s and the amount of antinutritional factors, except through a greater concentration of oil and omega-3 in certain varieties.

ii. Technological Processes

In parallel with the work of varietal selection, many technological processes were tested to reduce or remove antinutritional factors and improve the nutritional and digestibility values of the seeds.

The different processes tested so far relate to mechanical, or thermal, or thermomechanical, or enzymatic approaches.

It should be noted that the bibliography on the technological processes for processing flax seeds is very heterogeneous, partial, informative and most often old. Many of the published works have sought to compare one technology with an untreated control, or technologies in a pairwise comparison, using often different in vitro evaluation techniques, and/or in vivo studies under varying conditions.

Moreover, the partial results described in the literature are old and have not kept pace with changes in technology over the past 30 years. And they present only comparisons between technologies, without considering the optimization of these technologies or, better still, combinations of technologies.

For this reason, the current bibliography is exploitable to a certain extent but does not allow clear conclusions to be drawn on the technologies and corresponding parameters to be used, particularly for industrial implementation.

On the other hand, in vivo studies, which are generally rather old, have largely been carried out on animals with less productive genetics and foods less adapted to current food systems.

In fact, animal genetic selection, whose feed consumption index is increasing by an average of 2.5% per year, is carried out for world production, with maize- and soybean-based foods, which are classically used.

This does not allow optimal added value for the more diversified raw materials in energy and fat sources, such as flax seeds.

Therefore, the effects of ANF and technologies can probably be magnified from current in vivo assessment models. Because in this context, it is becoming increasingly difficult to make current flax seeds perform well.

It is in this sense that, although many technological treatments were tested in the past, some of them deserve to be re-examined in the current technical and economic contexts.

The main treatments so far tested on said flax seeds are the following:

1. Mechanical Treatments

The "classic" mechanical treatments (grinding, micronization) destroy the initial structure of the seeds by breaking the cell walls. These treatments allow the division into smaller particles by coarse grinding (5 mm particles) or fine grinding (2-3 cm screen), i.e. by crushing, bursting (hammer mill) or shearing (knife mill or cylinder).

The size of the particles obtained and their damage determine the degree of exposure of biochemical constituents to digestive agents (rumen microbes or intestinal enzymes) and thus the speed of their digestion. The tissue structure is largely preserved. However, grinding with a screen of 3 mm or even 1 mm followed by agglomeration destroys the tissue structure.

While flax seed digestibility can be improved by these mechanical treatments, there is no impact on antinutritional factors.

Another mechanical treatment consists of decoating the flax seed. Removing the seed coat removes the flakes that contain exclusively cellulose, fiber and certain antinutritional factors such as mucilage and concentrates certain nutrients such as fat, omega-3s and proteins.

However, few processes for decoating flax seeds have been developed, due to the technical difficulties of industrialization and economic profitability.

2. Heat Treatments

Heat treatments include granulation, toasting, flaking and autoclaving. The action of the heat is combined with that of external hydration in the form of water or steam at reduced pressure (long wet cooking at moderate temperature) with a superior effect of toasting and autoclaving compared with flaking and granulation.

These processes may have positive effects on the reduction of HCN levels, under certain conditions only, but have only small effects on the energy value of the seed in particular, and do not limit the negative effect of the fibers. This explains why they are not widespread in animal nutrition, due to lack of profitability.

3. Thermomechanical Treatments

There are two main thermomechanical treatments applied to flaxseed: trituration and cooking-extrusion.

Oilseed crushing is the first step in the process of obtaining edible oils, the second step being refining. Flaxseed crushing is generally carried out with the aim of separating by cold pressing, on the one hand, flaxseed oil intended more for the paint markets (and for the rare food destinations because of its high oxidability) and, on the other hand, flaxseed cake intended for the animal feed markets, like all oilseed cakes.

It is generally accepted that flaxseed cake does not undergo solvent extraction to extract the residual oil after the cold pressing step. Thus, this cake is still composed of about 13% fat, which is the same proportion of omega-3 as in the fat of the seeds.

But the major disadvantage of this process lies in the fact that, on the one hand, the cake intended for food is highly concentrated in cyanogenic compounds, without making the omega-3s very digestible.

On the other hand, the oil, which can in some cases be intended for food, is no longer accompanied by the hydrophilic antioxidants of the seed, which makes it highly oxidizable, especially since omega-3 fatty acids are highly unsaturated and therefore have a strong oxidative reactivity. This is moreover what has led to the drastic limitation of the use of flaxseed oil for partial use in human food.

Extrusion cooking, on the other hand, is a complex operation that is equivalent to several unitary operations: mixing, cooking and shaping. Each of these operations can be modulated, depending on the material to be treated and the product to be obtained, by the appropriate choice of the machine control parameters. Driven by worm screws, the material is subjected for a very short time (20 to 60 s) to high temperatures (100 to 200° C.), high pressures (50 to 150 bar), and more or less intense shearing. Under the action of these physical parameters, the material undergoes physicochemical modifications and homogenization. Its exit through the die gives it its final shape. The sudden drop in pressure during extrusion triggers an instantaneous vaporization of the water present, which can lead to a characteristic expansion of the product.

The first extruder-cookers were single-screw. The second generation of equipment are twin-screw devices (with two parallel, tangential or co-penetrating screws, rotating in the same or opposite directions); they are more flexible in use and allow in particular to work with greater regularity.

This process, as testified by the European patent no. 1 155 626, can allow under certain conditions the detoxification of part of the hydrocyanic acid and can improve the digestibility of seeds, but the results remain variable and not always reproducible, if the many parameters involved are not controlled: type of machine (single-screw/twin-screw), mechanical constraints (type of screw, lock, speed, die . . . ), thermal constraints (water, steam, duration . . . ), presentation constraints (die for flours, croquettes . . . ).

Thermomechanical processes are tending to develop for this type of use but it is necessary to master them well to exploit their potential.

4. Enzyme Treatments

All animals secrete enzymes to digest food. However, the animal's digestive process is not 100% efficient. For example, pigs and poultry do not digest 15 to 25% of the food they eat. The intake of exogenous enzymes in animal feed, especially monogastric enzymes, improves the digestibility of starches, proteins, fibers and minerals. This enzymatic contribution allows for better growth performance and a reduction in waste into the environment.

Enzyme supplementation is carried out using an isolated commercial enzyme, selected on a few enzyme activities. Concerning specifically flaxseed, few trials have sought to show the interest of this technique as a way to improve the nutritional value of flax seeds, probably because this seed will remain at low levels of incorporation in foods while its fiber is specific. For this reason, this enzymatic approach has not yet proven to be technically effective and economically viable.

5. Treatments Applied by the Economic Actors of the Breeding Sectors

The observation in today's breeding sectors is based on the fact that:

1—the varieties produced do not generally have their own characteristics in terms of composition beyond the oil and omega-3 contents, if not agronomic characteristics;

2—the technological processes for using seeds in animal husbandry are either basic, since they involve only mechanical crushing and trituration treatments for use in the form of oil and cake, or heat treatments for granulation, or partially elaborate, since they involve thermomechanical cooking and extrusion treatments for partial detoxification purposes, essentially.

Indeed, the uses currently present are either in the form of crushed, granulated or extruded seed, or in the form of oil. However, given the limits set out above for each of these treatments, the use of flaxseed in food remains underdeveloped, explained in particular by a lack of technical and economic viability, despite the advantages of omega-3s on health.

iii. In Summary

Some technical benefits can be provided through genetics. This is the example of the concentration of omega-3 in the seeds. Or by the way of the choice of seeds. This is the example of certain antinutritional factors such as cyanogenic compounds and mucilages in particular. Others can be by the way of transformation processes such as decoating, which allows to get rid of the mucilages contained in the coats, or thermal processes consisting in getting rid of HCN.

Finally, mechanical processes such as grinding help to improve the nutritional value of the seeds, as do thermal processes such as toasting and granulation, and/or thermo-mechanical processes such as crushing or cooking extrusion.

Separately, therefore, each of these pathways: genetic selection, choice of seeds or technological processes reported in the bibliography, proposes well known areas for improvement on the one hand on the limitation or elimination of antinutritional factors and/or on the other hand on the improvement of the digestibility/degradability values of seeds, but none of them is sufficient to be technically complete and economically unstoppable in terms of technical and economic value by animals.

In a historical market where the choice of plant sources of energy and/or lipids present in animal and human diets is based on essentially economic criteria, the place of flax seeds in relation to existing limits has been reduced to nothing, or to the rare exceptions of its nutritional benefits, to the benefit above all of carbohydrate energy sources such as cereals, and lipid sources such as palm, soybean, rapeseed, copra, sunflower oils, etc.

In a new market where the trend is not only to produce meat or eggs at a competitive price, but also to meet consumer expectations, the challenge now is to have competitive energy and lipid sources, but also sources of digestible essential fatty acids that are traceable, safe and locally produced.

B. A Favorable but Insufficient Context

To succeed in sustainably reintroducing flax seeds into the soil, into the troughs and bowls, and into the plates, there are favorable contextual elements such as "political" incentives ("Ecophyto" plan, "EcoAntibio" plan, etc.), agronomic assets (yield of the following cereals, less use of inputs, etc.), potential responses to many agricultural (soil and animal health, added value of production, economic sustainability, etc.) and societal (nutrition, health, local, biodiversity, environment, etc.) expectations.

However, this enabling environment is not sufficient to increase the use of flax seeds if plant and animal production systems are not technically robust and economically viable.

To this end, it must be accompanied by the development of the most efficient, safest and most robust technologies at the technical and economic level, in order to provide the best solutions for the agricultural and livestock sectors, and for other uses such as for domestic animals or directly for humans.

In short, a particular interest consists in improving the ratio of the amount of digestible (or available) omega-3 to the amount of residual ANF, or vice versa, regardless of the individual who consumes these flax seeds.

The present invention therefore aims to achieve this objective.

SUMMARY OF THE INVENTION

Thus, the present invention relates to a process for treating flax seeds (*Linum usitatissimum*) to enhance their value as food, in particular for animals, characterized in that it comprises the following successive steps:

a) Use of flax seeds on condition that these seeds have: a fat and/or omega-3 fatty acid content higher than the values indicated in the table below:

| Nutritional component high added-value | Unit | Content |
| --- | --- | --- |
| Fat | g/100 g raw | >38 |
| Omega-3 | % TFA | >54 |
| Omega-3 | g/100 g raw | >20 |

(TFA = total fatty acids)

and, only where said seeds are intended for the feeding of monogastric species, a value for water retention capacity or mucilage content, as well as a content of crude cellulose and/or neutral detergent fiber (NDF), these values/contents being lower than those indicated in the table below:

| Nutritional component low added-value | Unit | Content |
| --- | --- | --- |
| Raw cellulose | g/100 g raw | <11 |
| NDF | g/100 g raw | <22 |
| Mucilages | g/kg raw | <4.5 |
| Water retention capacity | g/g dry | <4.5 |

And with a hydrocyanic acid content of less than 250 mg per kilogram of raw material.

b) Mixing, where there are at least two raw materials of different nature and/or quality and then fractionating, or fractionating and then mixing, said seeds from step a) until the seed coats and kernels of said seeds break;

c) Implementing a thermal step of preparation of the seeds from step b) with steam and/or a water-based liquid, until a temperature of between and 90° C. and a moisture of more than 10%, preferentially 15%, is reached, the duration of this preparation being more than 2 minutes, preferentially 15 minutes;

d) Pressurizing the seeds or mixture from step c) for more than 10 seconds at a minimum pressure of 10 bars until a temperature of more than 80° C., preferentially between 100 and 150° C., is reached;

and/or d1) heating the seeds or mixture from step d) or step c) for a minimum of 15 minutes, preferentially 30 minutes to 2 hours, to a temperature above 80° C., preferentially of 90 and 150° C.

According to other non-limiting and advantageous characteristics of the invention:

- the thermal step c) of preparation is carried out in the presence of at least one exogenous enzyme identified among the following families: arabinofuranosidases, beta-glucanases, cellulases, glucoamylases, pectinases, pectin methyl esterases, phytases, proteases, xylanases and, preferentially, xylanases, beta-glucanases and pectinases, said exogenous enzyme having previously been added to the seeds or to the mixture;
- in the thermal step c) of preparation in the presence of exogenous enzyme, the moisture is set at a level of more than 15%, preferentially 25%, and the preparation is left to stand for at least 15 minutes, preferentially 60 minutes;
- when carrying out said thermal preparation step, the mixture is stirred;
- when mixing and then fractionating is carried out, a new mixing is carried out after the fractionation;
- said fractionation is continued until at least 90% of the seeds have a particle size of less than 2000 micrometers, preferentially less than 1500 micrometers;

step d) or d1) will be discontinued if the HCN content of the seeds is lower than that indicated in the table below and the AF content is higher than that indicated in the table below:

| Criteria for assessing treatment | Objective |
|---|---|
| HCN (mg/kg) | <30 |
| AF (%) | >65 | following step a), or upstream, the seeds are sorted according to a criterion chosen from among size, weight, shape, density, an aerodynamic, colorimetric or electrostatic parameter;

after step a), the seeds are decoated and one or other of the fractions is used, preferentially when the decoating is characterized by a concentration of at least 3% fat in the kernel fraction, preferentially at least 5%;

following step a) or b), the seeds, whole or decoated, are crushed and the cake is used, preferentially when it contains at least 8% fat;

at least one other raw material selected from the group consisting of protein-rich seeds, cereals, cereal and protein co-products, simple and complex carbohydrate sources, oilseed cake and other oilseed co-products is mixed with said flax seeds;

at least one antioxidant material is added to said seeds during the performance of at least one of said steps;

it comprises a step, after the implementation of step d), respectively d1), during which said seeds are cooled;

the seeds are finally packaged, transported and stored in a dark place;

said seeds are finally packaged under at least partial vacuum or by at least partial replacement of air by an inert gas.

DETAILED DESCRIPTION OF THE INVENTION

The process comprising the subject matter of the present invention consists of a combination of steps:

Step a): Use of Specific Seeds

Use of Flax (*Linum usitatissimum*) Seeds

A high content of at least one nutritional component, among fat and/or omega-3s. The seeds considered as selected or retained are those with a high fat and/or omega-3 content higher than the thresholds below:

| Species | Nutritional component high added-value | Units (to raw) | Range of variation | | High-content seeds |
|---|---|---|---|---|---|
| | | | Minimum | Maximum | |
| Flaxseed | Fat (FAT) | % | 30 | 50 | >38 |
| | Omega-3 (ALA) | % Total FA | 3 | 72 | >54 |
| | Omega-3 (ALA) | % | 1 | 36 | >20 |

Preferentially, high content seeds contain at least 40% FAT or even 42%; and 56% ALA in total FA or even 58%.

The selection of flaxseed on the basis of its nutritional quality has an impact on the technological steps implemented thereafter. The criteria retained here for the selection of flaxseed are the content of omega-3 in the form of α-linolenic acid (- or ALA -) as well as the fat content.

Choosing to use flax seeds rich in either of these criteria leads to an impact on the next steps resulting in increased digestibility and/or detoxification, as described below.

This is illustrated below by the example of a flax seed or the formulation of a blend based on flax seeds where the ALA content is set at 205 g/kg:

Selection of Flax Seeds by ALA Content

The higher the ALA content in flaxseed, the less incorporation is required to make the 205 g ALA blend. Thus, this lower incorporation leads to a lower level of added fat. In the thermomechanical process used, a lower fat content leads to a higher mechanical resistance of the seed to be treated. The result is an increase in digestibility read through the increase in available fat (AF), explained by more mechanical forces leading to more pressure and temperature. Indeed, these forces favor the rupture of cell walls and plasma membranes leading to a higher release of the fat contained in the lipid vacuoles. Thus, the higher the ALA content of flax seeds, the higher the AF of the treated flax seeds, and therefore the more digestible they will be for the animals.

Selection of Flax Seeds by Fat Content

The fat content of the seed has a significant influence on the total ALA content of the seed. Thus, the higher the fat content, and for the same 205 g objective, the less flaxseed is needed. This lower incorporation significantly reduces the intake of mucilage present in the seed. Thus, as described above, a lower mucilage content results in an increase in the digestibility of nutrients by the enzymes present (accessibility to the substrate, diffusion of enzymes, mechanical resistance). Thus, the higher the fat content of flax seeds, the more the efficiency of the enzymes is preserved.

And, only when said seeds are intended for the feeding of monogastric species, with a low water retention capacity or with two nutritional components of low added-value, namely neutral detergent fiber (NDF) and mucilages. Seeds selected or retained with low water retention capacity or low added-value nutritional component are considered as selected or retained seeds with low water retention capacity or low added-value nutritional component those whose contents and/or values are below the thresholds below:

| Nutritional component low added-value | Unit (to raw) | Range of variation | | Seeds used |
|---|---|---|---|---|
| | | Minimum | Maximum | |
| Raw cellulose | % | 3.5 | 15.3 | <11 |
| NDF | % | 12.1 | 30.9 | <22 |

| Nutritional component | Unit | Range of variation | | |
|---|---|---|---|---|
| low added-value | (to raw) | Minimum | Maximum | Seeds used |
| Mucilages | g/kg | 2.2 | 5.8 | <4.5 |
| Water retention capacity | g/gMS | 2.8 | 5.9 | <4.5 |

Preferentially, seeds with low contents contain at most 19% NDF, or even 17%; 4 g/kg mucilages, or even 3.5% or 4 g water retention per g DM.

In addition to the deleterious impact that soluble fiber has on the digestive processes of animals, it can also alter the technological process used to increase the digestibility of seeds—such as available fat—and to reduce or even remove their levels of antinutritional factors. Similar modes of action are explained below:

The impact of these soluble fibers is manifold and is characterized by an increase in viscosity due to the high affinity between the soluble fibers and water, which induces on the one hand a lesser accessibility of the substrate (barrier role) and an alteration of the diffusion of the enzymes; and on the other hand a stronger mechanical resistance limiting the diffusion of temperature, water, as well as the enzyme/substrate contact. The soluble fibers of flax seeds are particularly characterized by their mucilage content, and their hydrophilic properties are assessed by their water retention capacity (WRC).

And a hydrocyanic acid content of less than 250 mg per kilogram of raw material;

Step b): Mixing and Fractionation of Seeds

Choice of at least one mechanical mixing technology, where there are at least two raw materials of a different nature (i.e. at least one of which is not flax) and/or of a different quality, and of a mechanical seed fractionation technology set up in such a way that they allow, for the first, to make a homogeneous mixture of flax seeds and any additional raw materials, and for the second, to break the seed coat and kernels in order to make the nutrients more accessible to the enzymes (endogenous or exogenous and digestive) and thus improve the digestibility and detoxification of the seeds.

A preference is to pre-mix the materials before fractionation, but it is also possible to operate by first fractionating the materials separately and then mixing them, but also to carry out two mixing operations, one before fractionation, the other after.

The simple and/or combined mechanical stresses implemented to fulfil these functions can be obtained in particular by impact, cutting, compression, shearing or abrasion.

Seed fractionation is characterized by particle size measurement which determines the size of the particles resulting from the process. The maximum size of 90% of the particles resulting from this mechanical technology is preferentially less than 2000 μm and even more preferentially less than 1500 μm.

This dimension can be reached, for example, with a horizontal hammer mill according to the parameters below, for equipment with a capacity of 10 t/h and a 200 kW motor, rotation speed: 2800 rpm and screen size of 3 mm. This dimension can also be achieved with other usual equipment such as hammer and roller mills or crushers, paddle mills.

Finally, other technologies exist and can also fulfill this function: grinding wheel mill, disc mill, pin mill, cutting head mill, bead or ball mill, blade mill or crusher, impactor or impact mill, etc.

Step c: Preparatory Heat Treatment

This step consists in choosing at least one thermal technology parameterized in such a way that it respects the following characteristics:

A. First Possibility: Hydrothermal Preparation Step

This step has the double objective of initiating the detoxification of flax seeds by causing an activation of endogenous enzymes and facilitating the next thermal step by improving the heat conduction capacities.

This step consists of impregnating the seeds with water vapor and/or a liquid with water, in order to reach on the seeds previously fractionated, a temperature between 30 and 90° C. for a period of more than 2 minutes and a moisture of more than 10%.

In a preferential way, it is advisable to impregnate seeds for a duration higher than 5 minutes, or 15 minutes even 30 minutes, and preferentially lower than 4 hours, even 8 h, without exceeding 24 h for a moisture higher than 12%, even 15%, and lower preferentially than 40%, without exceeding 60%.

And in a very advantageous way, it is advisable to impregnate seeds for a duration higher than 1 hour, even 2 hours, for a moisture higher than 18%, even 20% or 25%.

Water can be added during this step and/or during the mixing step.

Hydrocyanic acid is the product of the degradation of cyanogenic compounds (linamarin, linustatin, neolinustatin) by beta-glucosidase. The temperature, time and moisture conditions mentioned above allow an effective enzymatic action. It should also be remembered that soluble fibers increase viscosity due to the strong affinity between mucilages and water and can thus limit the effectiveness of this enzymatic process (accessibility to the substrate, diffusion of enzymes, mechanical resistance). Below 30° C., the enzymes are very little active if at all, and above 90° C., most of them are deactivated by heat, even above 60° C.

The equipment capable of carrying out this step is, in a non-exhaustive way: a preparer, a pre-conditioner and conditioner, a cooker, a mixer, a toaster, a steam impregnator, a maturer.

B. Second Possibility: Hydrothermal and Enzymatic Preparation Step

This preparation step consists of applying the same preparation conditions as described in the first possibility. It is distinguished simply by the fact that at least one exogenous enzyme, not present in flax seeds, is activated, which can be supplied in particular as a processing aid (enzyme extract, etc.), from additives, raw or fermented raw materials, etc., and added to the process at one of the preliminary steps, or during the process.

The temperature characteristics are then chosen in such a way that they correspond to the activity ranges of the enzymes selected, but remain between 30 and 90° C. The time and moisture characteristics required are the same as those described above, considering nevertheless that these exogenous enzymes require more favorable conditions than endogenous enzymes, because they are not spatially and temporally as close to their substrates.

It is in this sense that it is necessary to adapt the impregnation conditions so that the impregnation lasts at least 15 minutes, preferentially 60 minutes, and preferentially less than 4 hours, or even 8 hours, without exceeding 24 hours for a moisture higher than 15%, preferentially 25%, and preferentially less than 40%, without exceeding 60%.

The enzyme (or enzymes) to be introduced belongs (or belong) to the families of arabinofuranosidase, beta-glucanases, cellulases, glucoamylase, pectinases, pectin methyl esterase, phytase, proteases, xylanases, galactosidases, and preferentially to xylanases, beta-glucanases and pectinases.

It (or they) will have been chosen beforehand for its (their) efficiency in hydrolyzing particular chemical bonds that the animal is not able to perform at all or not completely or not quickly enough. In particular, the target will be to degrade carbohydrates that are not or poorly hydrolyzed in the animal to allow better accessibility of the other constituents of the seed by digestive enzymes, which accessibility can be explained, among other things, by the decomplexing of the carbohydrates with the nutritional or antinutritional compounds.

The equipment capable of performing this step are for example: a preparer, a pre-conditioner and conditioner, a cooker, a mixer, a toaster, a steam impregnator, a maturer, a reactor.

Step d/d1: Heat Treatment

This step of heat treatment is carried out with and/or without pressure.

A. Pressurized Heat Treatment Step

This step consists in putting the seeds, or the mixture thus prepared, under a minimum pressure of 10 bars, preferentially higher than 20 bars, during a time higher than 10 seconds, preferentially between 10 seconds and 2 minutes, at a temperature higher than 80° C., preferentially higher than 100° C., or even included between 100 and 150° C., and in a more advantageous way still between 110 and 140° C. (and without ever exceeding 160° C.).

This temperature is advantageously allowed by self-heating due to shear forces, friction and compression and possibly additionally by exogenous heat input, by conduction (heat transfer fluid, electrical resistance, electromagnetic fields, etc.) or by the addition of steam.

Indeed, the increase of the pressure exerted on the previously fractionated and prepared flaxseeds, leading in addition to an increase of the temperature, will allow on the one hand a better evaporation of the HCN released thanks to a sudden change of pressure, or in other words, thanks to an isothermal expansion, and on the other hand an improvement of the digestibility of the seeds, and in particular of the omega-3s thanks to the rupture of the cellular walls thus facilitating the availability and thus the accessibility to the lipids of the seeds.

Also, this step has the effect of inhibiting enzymatic activities due to the induced temperature.

A non-exhaustive list of pressurized heat treatment equipment capable of carrying out this step is as follows: extruder, cooker-extruder, expander, press.

This step aims to reduce antinutritional factors and improve the digestibility of energy and/or protein, while deactivating endogenous and/or exogenous enzymes.

B. Pressureless Heat Treatment Step

This step consists of a pressureless heat treatment, the duration of which is then extended so that it is longer than 15 minutes, preferentially 30 minutes or even between 30 minutes and 2 hours, and the temperature is higher than 80° C., preferentially higher than 90° C. or even between 90 and 150° C.

This temperature is allowed by an exogenous heat input, by conduction (heat transfer fluid, electrical resistance, electromagnetic field, etc.) or by adding steam for example.

The objective of this step is to inhibit enzyme activities and evaporate the released HCN. Since evaporation is less abrupt here, it is necessary to increase the time the material is exposed to a sufficiently high temperature to allow the hydrocyanic acid to change state from the liquid to the gaseous state.

Likewise, the appropriate equipment for this pressureless heat treatment is, for example, the dryer, toaster, thermostatically controlled screw, etc.

This step also aims to deactivate endogenous and/or exogenous enzymes, while improving the availability of the fat, especially in the case of heat treatment under pressure. Finally, it allows, if need be, to reduce the moisture of the mixture which should not exceed 14%, preferentially 12% to allow a good state of conservation of the mixture.

One way to characterize the effectiveness of this step (these steps) is to evaluate the reduction of hydrogen cyanide (HCN) and the improvement in available fat (AF).

Thus, the HCN value is expected to be less than 30 mg/kg, preferentially 20 mg or even 10 mg. And concerning AF, it is expected to be at least above 65%, preferentially 70%, or even 75%, and even 80%.

The preceding steps of the process, as described above, can also be implemented in a cost-effective manner, taking into account the elements described below:

Cooling

At the end of the previous step, the treated seeds are hot. They then need to be cooled to bring them down to a temperature that allows them to be stable over time, and thus be preserved and stored in good conditions until consumption. For example, the temperature should not exceed 30° C. above ambient temperature, preferably 20° C.

Sorting

This sorting step groups seeds according to criteria of size, weight, shape, density or according to aerodynamic, colorimetric or electrostatic characteristics. The tools used to carry out these operations are in particular: the sifter, the cleaner-separator, the bolter, the de-stoner, the plansimeter, the densimetric table, the winnower, the optical sorter, the aeration systems (air column, suction, blower, etc.), magnetic.

The purpose of this operation may be to separate seeds of different species, to remove impurities, to allot seeds of identical species, etc. The seed may be separated from other species, or it may be allotted to the same species.

Decoating

The purpose of a decoating step is to concentrate the protein, energy in the form of lipids, or fiber contents. It leads to the production of several fractions including a part called the kernel and another part called coat.

This operation thus makes it possible to meet the nutritional needs of different species by limiting the proportion of poorly digestible components on the one hand, and by reducing the concentration of certain antinutritional factors on the other hand, in this case in the so-called kernel fraction. The so-called coat fraction is more concentrated in fibers, mucilages and lignans and more diluted in fats, omega-3 and proteins. Thus, the use of so-called kernel fractions rather than whole seed makes it possible to limit the proportions of soluble fibers for the same quantity of omega-3, which leads to improving the effectiveness of the enzymatic mechanisms (accessibility to the substrate, diffusion of enzymes, mechanical resistance). As for the cyanogenic compounds, they are particularly present in the kernel, but without being very diluted in the coats.

This decoating step is characterized by a minimum yield assessed from the effect of concentration or dilution of at least one of the following constituents with regard to the most concentrated kernel fraction:

Fats +3%, then 5%, then 10%
Crude proteins +3%, then 5%, then 10%
Raw cellulose −5%, then −10%, then −15%.
Mucilages −20%, then −30%, then −40%.
Lignans −20%, then −30%, then −40%.

Decoating is carried out by combining a mechanical stress phase and a separation phase, following, if necessary, a possible rehydration of the kernel, preceded by a heat pre-treatment phase to facilitate the peeling.

The simple and/or combined mechanical stresses used to fulfil these functions may be impact, compression or abrasion. The tools used to carry out this phase include, but are not limited to, the following: roller and hammer mills or crushers, the impact compactor or impact mill, the polisher, the paddle mill, the grinding wheel mill, the disc mill, the pin mill, the cutting head mill, the bead or ball mill, the blade mill or blade crusher, etc.

Separation can be carried out according to criteria of size, weight, shape, density or according to aerodynamic, colorimetric or electrostatic characteristics. The tools used to carry out this phase are, in particular: the sieve shaker, the cleaner-separator, the bolter, the de-stoner, the plansimeter, the densimetric table, the winnower, the optical sorter, the aeration systems (air column, suction, blower, etc.) or even magnetic, etc.

At the end of this step, it should therefore be specified that the following steps of fractionation (if necessary), heat preparation (if necessary) and heat treatment as described are carried out on co-products of flax seeds, and not on whole flax seeds.

Seed Crushing and Processing of Flaxseed Meal

Alternatively, it is possible, after step a) or b) described above, to crush the whole or decoated flax seeds so that flaxseed oil and flaxseed cake are obtained. Since flaxseed cake still contains more than 8% fat, preferably 10% or even 12%, it still contains a certain amount of omega-3, but above all a large amount of HCN.

As previously at the decoating step, it should therefore be specified that, after this crushing step, the following steps of fractionation, heat preparation (if necessary) and heat treatment as described are carried out on the flaxseed cake, a co-product of the crushing of flax seeds, and not on whole flax seeds.

Use of Additional Raw Material(s)

It becomes advantageous to choose at least one raw material to be added to flaxseed, which will be selected for its technological and/or nutritional and/or economic properties. Indeed, depending on the use that will be made of the mixture resulting from the process, and its destination in terms of animal species and physiological step in particular, the choice of the raw material(s) will focus in particular on the nutritional characteristics and cost of raw materials.

But they will also have to be chosen on the basis of their technological advantages, in particular through:

their physical properties and therefore their predisposition to make the process stresses more advantageous, thus modifying the pressure forces and thermal energy, considering in particular their rheological behavior during the process;

their capacity to mix with flax seeds in wet conditions and therefore their capacity for adsorption (surface uptake) or absorption (uptake by assimilation) of oil and/or water;

the presence and/or abundance of enzymes of interest, endogenous to the additional raw material, and therefore their ability to enhance the enzymatic activities of the process, for example via beta-glucosidase to improve the detoxification of flax seeds.

Advantageously, flax seeds will be associated preferentially with a share of protein-rich seeds and/or cereals, especially when the heat technology involves a heat treatment step under pressure.

In fact, in order to force the passage through the extruder, the addition of protein-rich seeds and/or cereals allows flax seeds to be technologically better processed and increases the bioavailability of the fat.

Finally, more generally, the choice of additional raw material is preferably based on the potential for nutritional and economic improvement that can be achieved by this process applied to flax seeds.

Thus, among the additional raw materials, preference will be given first to protein-rich seeds and cereals, then to cereal and protein co-products, simple or even complex carbohydrate sources, and oilseed cake and other oilseed co-products, then to all other raw materials usual in animal nutrition.

Use of an Antioxidant Solution

It may be prudent, to preserve the nutritional and functional integrity of the omega-3s of flaxseed resulting from the process, to add a step acting as an antioxidant solution.

Flaxseed is already naturally endowed with antioxidants in the form of lignans, a family of phytoestrogens. Nevertheless, it is recommended, if necessary, to add an antioxidant solution, especially when the conditions and duration of transport and storage prove to be restrictive. Temperature, light and aeration are all factors, not exhaustive, that promote the risk of oxidation of fatty acids, and on which it may be technically and economically difficult to act.

The proposed antioxidant solution consists of the use of at least one of the following solutions:

Packaging, transport and storage of the seeds resulting from the invention away from light; for example so-called "big bags" and other opaque containers;

Packaging in a bag in which at least a large part of the oxygen in the air has been removed (vacuum packaging); or replaced by an inert gas, for example nitrogen (inerting packaging);

Addition of at least one antioxidant, preferentially several in such a way that they act in a complementary manner at the different stages of the oxidation process, from initiation to propagation, whether they are lipophilic and hydrophilic in nature and of chemical and/or natural origin. This antioxidant contribution will preferentially take place before the fractionation and mixing step, in powder and/or liquid form.

In a non-exhaustive way, mention may be made of several antioxidants of natural or synthetic origin:
- phenolic compounds in various forms: simple phenols, flavonoids, isoflavonoids and anthocyanins, phenolic acids and coumarins, lignans, lignins, stilbenoids, non-phenolic metabolites, naphthoquinones, tannins, resveratrol, procyanidins, rosmarinic acid, terpenoid compounds, lecithins . . .
- vitamins such as ascorbic acid and its salts (vitamin C), tocopherols (vitamin E); β-carotene (provitamin A) and other carotenoids, tocotrienols . . .
- propyl gallate, citric acid, butylated hydroxyanisole (BHA), butylated hydroxytoluene (BHT), tertiary butylhydroquinone (BHQT) . . .

Stirring in the Thermal Preparation Step

In step c), one advantage is that the seed, or the mixture, is stirred so that it undergoes the same treatment conditions. Indeed, stirring will:
- homogenize the fractionated seeds with the water and other possible complementary inputs, with the aim in particular of facilitating the functionality, as soon as the enzymes come into contact with their substrates, of the antioxidant function on the fatty acids;
- homogenize the added water and the temperature within the seeds or the mixture;
- avoid the formation of agglomerates and thus facilitate the transport conditions of the seed or mixture.

This process achieves technically advantageous results with regard to the prior art.

In fact, no process widespread in the bibliography achieves the technical and economic improvements obtained by the present process, particularly with regard to recent animal production systems, characterized by significant genetic advances adapted to a feeding system based essentially on soybean, grain maize and cereals. The combination of the various stages described above makes it possible to obtain a flax seed characterized by, at the same time:

1) Higher Content of at Least One Nutritional Component

| Nutritional component highly valued | Unit (to raw) | Range of variation Minimum | Range of variation Maximum | Seed resulting from the invention |
|---|---|---|---|---|
| Fat | % | 30 | 50 | >38 |
| Omega-3 | % Total FA | 3 | 72 | >54 |
| Omega-3 | % | 1 | 36 | >20 |

Preferentially, the seeds resulting from the invention contain at least 40% fat, or even 42%; and 56% ALA in total FA, or even 58%.

2) Lower Content of at Least One Nutritional Component of Low Value or Low Water Retention Capacity:

| Nutritional component low value | Unit (to raw) | Range of variation Minimum | Range of variation Maximum | Cooked seed |
|---|---|---|---|---|
| NDF | % | 12.1 | 30.9 | <22 |
| Mucilages | g/kg | 2.2 | 5.8 | <4.5 |
| Raw cellulose | % | 3.5 | 15.3 | <11 |

Preferentially, the seeds resulting from the invention contain at most 19% NDF, or even 17%; and 4 g/kg mucilages, or even 3.5.

3) Lower Content of Hydrocyanic Acid

| Antinutritional factor | Unit (to raw) | Range of variation Minimum | Range of variation Maximum | Cooked seed |
|---|---|---|---|---|
| HCN | mg/kg | 130 | 450 | <30 |

Preferentially, the seeds resulting from the invention contain at most 20 mg or even 10 mg HCN per kg.

4) Improved Level of Fat Availability and/or Energy Digestibility and/or Protein and its Amino Acids:

| | Available fat (AF) | Energy digestibility (% increase) | Protein/amino acid digestibility (% increase) |
|---|---|---|---|
| Poultry | 65% | ME (kcal) +20 to 100% | DUC (%) +5 to 30% |
| Pigs | | ME (kcal) +40 to 100% | DUC (%) +5 to 15% |
| Fish | | DUC (%) +10 to 40% | DUC (%) +5 to 15% |
| Other species | | % increase +10 to 40% | DUC (%) +5 to 15% |

Preferentially, the seeds resulting from the invention will have an available fat content of at least 70%, even 75% and up to 80%, under the operating conditions used, after 10 minutes of extraction.

The results presented above are comparable to a seed having undergone only a fractionation step similar to that described in the invention and a granulation step at a temperature <100° C. And the results are also derived from current animal genetics, being considered from breeds selected for their productivities.

The results presented below highlight the synergistic effect on the digestibility of the energy of flax seeds of the combination of the selection of the flax seed and its technological treatment according to the methods specified by the invention.

| Seed selection according to the invention (Fat, omega-3, NDF, Mucilages, CRE) | Technological treatment according to the invention (Mixing, Fractionation, Heat Preparation, Heat Treatment) | Nutritional enhancement by poultry on a 100% basis Energy digestibility |
|---|---|---|
| No | No | 100 |
| Yes | No | 149 |
| No | Yes | 110 |
| Yes | Yes | 203 |

Base 100 = flaxseed not selected & not treated as described in the table above

Nutritional value in poultry is evaluated through two parameters: energy digestibility or metabolizable energy (ME); protein digestibility (DUC N).

On energy digestibility, when the approaches are considered in isolation, the impact of flaxseed selection allows a 49% increase in its value; the impact of technological processing allows a 10% increase. When these two approaches are both considered, the impact is 103% in relation to the flax seed not selected and not treated as described by the invention. It is therefore not a simple addition of the approaches of selection (+49%) and technological treatment (+10%) but a true synergy (=103%).

From these various characteristics, it can also be noted that the present invention makes it possible to improve the detoxification and nutritional value of flax seed with regard to the bibliography and in particular the aforementioned European patent.

In terms of gross detoxification, the present invention improves the residual content of cyanogenic compounds to the extent that the measured HCN reaches 30 mg per gross kg of seed, compared to 50 mg according to patent EP 1 155 626.

|  |  | Raw flaxseed | Flaxseed according to patent EP 1 155 626 | Flaxseed according to the present invention |
|---|---|---|---|---|
| HCN content | mg/kg raw | 265 | 50 | 30 |

Knowing that the invention is preferentially capable of reducing the HCN content below the threshold of 20 mg/kg or even 10 mg/kg.

In terms of risk benefit analysis, it is also interesting to compare the quantity of HCN per kg of omega-3 provided.

The present invention makes it possible to reduce the level of HCN in relation to patent EP 1 155 626 from 160 mg to 145 mg/kg omega-3.

|  |  | Raw flaxseed | Flaxseed according to patent no. 1 155 626 | Flaxseed according to the present invention |
|---|---|---|---|---|
| HCN content | mg/kg omega-3 | 1100 | 160 | 145 |

Knowing that the invention can preferentially reach 100 or even 50 mg of HCN per kg omega-3.

Finally, a final way of presenting the advantage of the invention consists in comparing the HCN content per kg of available omega-3, using the AF criterion as a predictor of the digestibility of fat. Thus, it is shown that the present invention makes it possible to obtain a better efficiency ratio with respect to the aforementioned patent.

|  |  | Raw flaxseed | Flaxseed according to patent EP 1 155 626 | Flaxseed according to the present invention |
|---|---|---|---|---|
| HCN content | mg/kg of omega-3 available | 3700 | 2000 | 250 |

Knowing that the invention can preferentially reach 145 or even 65 mg of HCN per kg of available omega-3.

But the present invention also goes beyond an improvement in benefit/risk by proposing to use seeds with a more digestive basis in view of their lower content of compounds with low value. This is how a comparison between raw seed and seed resulting from the invention is presented in the table below, on the quantities of NDF and mucilages in g per kg raw, but also in g per kg omega-3 and especially in g per kg of available omega-3.

This demonstrates the double advantage of a seed with fewer low-value compounds on the one hand and more omega-3 available on the other.

|  |  | Flax seed raw | Flax seed according to the invention |
|---|---|---|---|
| NDF | g/kg raw | 240 | 190 |
| NDF | g/kg of omega-3 | 996 | 926 |
| NDF | g/kg of omega-3 available | 3351 | 1543 |
| Mucilages | g/kg raw | 5 | 4 |
| Mucilages | g/kg of omega-3 | 21 | 19 |
| Mucilages | g/kg of omega-3 available | 70 | 32 |

These characteristic results of the seeds resulting from the invention are synergistic insofar as hydrocyanic acid is not involved in the so-called digestibility results, nor is the availability of the fat, which proves to be well correlated with the digestibility results.

Indeed, HCN has a negative effect on the animal's energy metabolism. It has the effect of inhibiting the enzymatic activity of the cytochrome oxidase used for electron transport in the respiratory chain to form ATP molecules.

Thus, the invention has the advantage of not only achieving high levels of so-called AF and digestibility of flax seeds, high contents of nutritional components and low contents of low value components, but also avoiding technical malfunctions and other health problems related to the potential emanation of HCN.

0) Digestibility Test on Broilers

In an experimental farm, the digestibility of flax seeds from different technological routes was evaluated. The digestibility tests were conducted on male chicken (ROSS PM3) by substituting 30% of the basic feed with the seeds to be tested. The energy value and digestibility of the protein are calculated by difference taking into account the principle of additivity. The approaches tested are in isolation and cumulatively the impact of the flaxseed selection and the technological treatment of the latter as described in the invention. The table below shows the following: Characteristics of the selected flax seeds; Characteristics of the technological processes; Characteristics of the treated flax seeds.

| Characteristics of the invention | | | | |
|---|---|---|---|---|
| Flax seed selection step according to the invention | No | No | Yes | Yes |
| Technological treatment step for flax seeds according to the invention | No | Yes | No | Yes |

-continued

| Characteristics of flax seeds | | | | |
|---|---|---|---|---|
| Fat, % | | 43.6 | | 42.7 |
| Omega-3, % TFA | | 59.2 | | 58.2 |
| NDF, % | | 23.1 | | 19.0 |
| Mucilages, g/kg | | 4.7 | | 2.4 |
| Water Retention Capacity (%) | | 5.1 | | 3.5 |
| HCN Flaxseed, mg/kg | | 294 | | 271 |
| Flaxseed treatment processes | | | | |
| Mixing | — | No | — | No |
| Fractionation | — | Yes | — | Yes |
| Decoating | — | Yes | — | Yes |
| Thermal preparation | | | | |
| Temperature | — | 45° C. | — | 45° C. |
| Humidity | — | 11% | — | 11% |
| Duration | — | 15 min | — | 15 min |
| Heat treatment | | | | |
| Temperature | — | 135° C. | — | 135° C. |
| Duration | — | 15 s | — | 15 s |
| Pressure | — | 20 bars | — | 20 bars |
| Characteristics of treated flax seeds | | | | |
| ME Flaxseed, kcal/kg | 1842 | 2020 | 2751 | 3743 |
| ME Flaxseed, on a 100 basis | 100 | 110 | 149 | 203 |

Base 100 = flaxseed not selected & not treated as described in the table above

This digestibility trial in chickens illustrates the value of flaxseed selection and processing technology in isolation, the selection of the seeds and their technological treatment:

On energy, the impact of selection is +49%, the impact of treatment is +10% in digestibility compared to unselected or untreated seeds;

When the two approaches are applied jointly, it is not a simple additive effect of the impacts considered in isolation that is achieved, but rather a synergy of them:

On energy, the impact of the selection and technological treatment of flax seed, as described by the invention, is +103% compared with a non-selected and non-technologically treated flax seed:

Thus, the invention as described provides a real advantage in terms of value to the animal. This can be seen through its energy recovery, as described above. It is the result of seeds with a higher nutritional density but also of a more efficient technological treatment.

Thanks to these advantages, the invention has led to zootechnical results that are hitherto unequalled in animal husbandry.

Several zootechnical tests on monogastric animals and an in vitro test on ruminants were carried out in different species and farms, making it possible to validate under production or extrapolation conditions the technical advantages obtained by the invention. These tests are supplemented by a study of economic interest.

1) Zootechnical Test on Laying Hens

In an experimental farm, for about 3 months, 3% flax seed from the invention, combined with 3% fava bean seed, was fed to laying hens (Isa-Brown), taking into account the ME (metabolizable energy) and DUC N (protein digestibility) values previously determined by a digestibility study.

Given the methodology used to formulate feeds for laying hens in iso-nutrients (metabolizable energy, digestible essential amino acids, calcium, phosphorus, etc.) taking into account the differences in digestibility values evaluated earlier, the objective of this trial was to verify whether, thanks to the synergistic effect of a reduction in antinutritional factors, the invention made it possible to obtain a level of zootechnical performance at least equal to or even higher than that of a reference feed.

The flaxseed resulting from the invention is the result of a combination of treatments, first of all selection, making it possible to isolate seeds with particular characteristics (fat %, omega-3, NDF, Mucilages, CRE) mentioned in the table below. This seed is then crushed and thermally prepared for 15 minutes, incorporating steam increasing the temperature to 45° C. and 11% humidity. Finally the crushed seed is preheated and preheated and subjected to a pressure of 20 bars for 15 seconds, the temperature is then 135° C.

The table below thus presents:

The nutritional characteristics retained for the flaxseed resulting from the invention on the one hand and for the flaxseed having simply been crushed on the other hand, in comparison with another standard flaxseed not tested in laying hens, which values have been previously determined by the study of their digestibility on chicken according to the usual protocols known to the skilled person and referring to;

Egg laying performance in terms of egg weight, exported egg mass (taking into account the number of eggs laid) and feed efficiency (feed efficiency to produce 1 egg).

TABLE

Characteristics of rations and flax seeds for laying hens, and associated production performance

| | Control Flax seed-free | Standard flaxseed only crushed | Trial flax seed only crushed | Trial flax seed resulting from the invention |
|---|---|---|---|---|
| | Characteristics of the ration | | | |
| ME ration, kcal/kg | 2800 | — | 2800 | 2800 |
| Digestible lys, g/kg | 6.9 | — | 6.9 | 6.9 |
| | Characteristics of flax seeds | | | |
| Fat, % fat | | 37.4 | | 42.7 |
| omega-3, % TFA | | 55.3 | | 58.2 |
| NDF, % | | 23.8 | | 18.3 |
| Mucilages, g/kg | | 3.9 | | 3.4 |
| CRE (%) | | 6.3 | | 3.8 |
| HCN Flaxseed, mg/kg | — | 290 | | 271 |
| AF flaxseed, % | — | 45.7 | | 40.2 |

TABLE-continued

Characteristics of rations and flax seeds for laying hens, and associated production performance

|  | Control Flax seed-free | Standard flaxseed only crushed | Trial flax seed only crushed | Trial flax seed resulting from the invention |
|---|---|---|---|---|
| Flaxseed treatment processes | | | | |
| Mixing | — | — | No | No |
| Fractionation | — | — | Yes | Yes |
| Thermal preparation | | | | |
| Temperature | — | — | — | 45° C. |
| Humidity | — | — | — | 11% |
| Duration | — | — | — | 15 min |
| Heat treatment | | | | |
| Temperature | — | — | — | 135° C. |
| Duration | — | — | — | 15 s |
| Pressure | — | — | — | 20 bars |
| Characteristics of treated flaxseed | | | | |
| ME Flaxseed, kcal/kg | — | 1842 | 2751 | 3743 |
| DUC N Flaxseed, % | — | 54 | 67 | 71 |
| HCN Flaxseed, mg/kg | — | 290 | 271 | 19 |
| AF flaxseed, % | — | 49.8 | 45 | 81 |
| Production performance of hens | | | | |
| Weight of eggs, g | 61.9 | — | 63.1 | 63.2 |
| Export mass, g/d | 61.0 | — | 61.4 | 61.8 |
| Egg-laying rate, %. | 98.6 | — | 97.3 | 97.8 |
| Consumption index | 1.92 | — | 1.94 | 1.93 |

First, it can be seen that the differences in digestibility values between the 3 flax seeds are highly different. The values of ME and DUC N go from 1842 kcal and 54% respectively for a standard flax seed, to 2751 kcal and 67% for a previously selected but only crushed flax seed, to 3743 kcal and 71% for the same selected flax seed but having undergone the entire process of the invention.

These production performances of the laying hens are to be put in relation with the composition characteristics of the flax seed selected and then treated in mg, NDF, Mucilages then ME and DUC N on the one hand and with the efficiency characteristics of the treatment in terms of HCN and AF on the other hand. These performances are the result of a positive interaction between a selection of adapted flax seeds and an optimized technological process.

Therefore, compared with the control lot with soybean meal, which is already very well characterized in terms of digestibility values and production performance, it should be assumed that:

The results obtained, in terms of hen production performance, with the "trial only crushed" flax seeds are significantly lower than the "soybean meal" control, highlighting the negative effects of antinutritional factors on the hen's laying performance. In fact, the main finding is that the hens in this batch had a lower laying rate but a higher egg weight, resulting in them exporting a little more egg mass, but consuming more feed to produce the same amount of eggs, a sign of a slight loss in feed efficiency (increase in feed efficiency index).

While the nutritional value of the flaxseed "Trial from the invention" was already significantly higher than the flaxseed "Trial only crushed," the results obtained with the flaxseed of the invention show a significant improvement in the various performance criteria.

This is how the advantage of the invention can be observed. Not only does the flaxseed of the present process have superior nutritional values in so-called digestibility studies, but it also avoids the harmful effects of antinutritional factors while at the same time achieving production performances similar to soybean meal.

2) Zootechnical and Economic Test on Broiler Poultry

At a reference fast strain chicken farm, two identical buildings were fed two feeding programs. The usual program based on soybean and cereal oil cake and oil is compared with the feed program including a proportion of flaxseed from the invention, mixed with protein-rich seeds. This mixture, in a ratio of 70% flax seeds and 30% fava bean seeds, was distributed at a rate of 2.5% during the growing period and 3% during the finishing period.

The technical and economic performance was evaluated on the basis of consumption, animal weight, growth, feed conversion, mortality and feed cost.

In this trial, the nutritional values of flaxseed used in the formulation of the food were based on the so-called digestibility values previously determined. The objective was therefore to verify whether the zootechnical performance of the chickens was equal to or better than that of the control lot.

The table below shows the characteristics of flax seeds, the technological treatments used, the processed flax seeds and the technical and economic performance data obtained.

|  | Control batch without flax seed | Trial batch with flaxseed only crushed | Trial batch with flaxseed result of the invention |
|---|---|---|---|
| Characteristics of the ration ||||
| ME ration, kcal/kg | 3050 | — | 3050 |
| Digestible lys, g/kg | 10 | — | 10 |
| Characteristics of flax seeds ||||
| Fat, % fat |  |  | 42.3 |
| omega-3, % TFA |  |  | 59.3 |
| NDF, % |  |  | 16.9 |
| Mucilages, g/kg |  |  | 3.7 |
| Water Retention Capacity (%) |  |  | 4.0 |
| HCN Flaxseed, mg/kg |  | — | 135 |
| AF flaxseed, % |  | — | 38.5 |
| Flaxseed treatment processes ||||
| Mixing | — | No | No |
| Fractionation | — | Yes | Yes |
| Thermal preparation ||||
| Temperature | — | — | 45° C. |
| Humidity | — | — | 11% |
| Duration | — | — | 15 min |
| Heat treatment ||||
| Temperature | — | — | 135° C. |
| Duration | — | — | 15 s |
| Pressure | — | — | 20 bars |
| Characteristics of treated flaxseed ||||
| ME Flaxseed, kcal/kg |  | 2751 | 3743 |
| DUC N Flaxseed, % |  | 67 | 71 |
| HCN Flaxseed, mg/kg |  | 135 | <10 |
| AF flaxseed, % |  | 43.2 | 79.8 |
| Chicken production performance Based on 100 of the control ||||
| Average weight | 100 | — | 104 |
| Average daily gain | 100 | — | 104 |
| Technical consumption index | 100 | — | 96 |
| Performance index | 100 | — | 109 |
| Economic consumption index | 100 | — | 96 |

Thus, the technical results enabled by the invention first of all demonstrated the efficiency of the process in reducing the HCN content and increasing the AF content; and above all they compensated for the additional food cost, with a 4% improvement in the economic index.

Thus, the solution proposed by the invention has led to a significant improvement in technical (weight +4%, GMQ +4%, technical IC −4% and performance index +9%) and economic performance.

According to these zootechnical results, the digestibility values of the flax seeds resulting from the invention cannot alone explain the improved performance.

Indeed, while the digestibility results were taken into account during feed formulation, the production performance observed is higher, a sign of a synergistic effect related to a better feed value of flaxseed, expressed at the level of the animal's metabolism, and which can be linked to the reduction of antinutritional factors.

3) In Vitro Study of Fatty Acid Biohydrogenation in Ruminants

In ruminants, dietary lipids are lipolyzed and unsaturated fatty acids are partially hydrogenated in the rumen. They are absorbed in the small intestine and pass partly, and after possible desaturation, into milk and meat. This hydrogenation reaction of unsaturated fatty acids by ruminal bacteria is called biohydrogenation.

For polyunsaturated fatty acids, it is broken down into several stages and always starts with a first isomerization reaction. This isomerization is carried out by different ruminal bacteria, resulting in the formation of various isomers. For alpha-linolenic acid ALA, the first isomerization reaction is followed by three reductions leading to the synthesis of 18:0 stearic acid.

Intermediates of this biohydrogenation, such as conjugated linolenic acids (CLnA), derived from the biohydrogenation of ALA, may have properties beneficial to human health. Vaccenic acid (trans11-C18:1) is also produced during the biohydrogenation of ALA and can be desaturated to CLA in the udder of ruminants and in the consumer's body. Therefore, increasing its production in the rumen is also of interest, as trans10-C18:1 acid is not increased in the same proportions. Indeed, this last fatty acid is indicative of a ruminal dysfunction and is known for its harmful properties on the metabolism of ruminants and the nutritional quality of products for humans.

The study and control of ruminal biohydrogenation of fatty acids is therefore an essential point for mimicking (imitating) the effects of a grass-based diet on the one hand, and for improving the rumen microbial balance and the nutritional quality of ruminant production on the other.

In order to determine the interest of the invention in the feeding of ruminant animals, the disappearance of omega-3 ALAs by biohydrogenation, and their fate in different intermediate fatty acids of hydrogenation were evaluated compared with flax seeds in its different known forms, and compared with the omega-3 ALAs of a reference grass.

The flax seeds in their various known forms resulting from the invention have all been analyzed to determine, in particular, the content of available fat (AF) after 10 minutes of stirring, according to the method previously described.

The differently treated seeds, oil and reference grass were introduced in nylon bags (registered trademark) and incubated in vitro in rumen juice for 2-6 hours. Fatty acids were analyzed in the initial products and at the end of incubation to calculate a percentage disappearance (biohydrogenation rate, which measures the efficiency of the initial isomerization step) of ALA, the fate of this ALA in CLnA and C18:2 trans11-cis15, the fate of the unsaturated AGs of the flax seed in C18:0, but also the proportion of C18:1 t11 appearing and the ratio between C18:1 trans 11 and C18:1 trans 10.

In order to best mimic the hydrogenation kinetics of grass ALA, it is necessary to approximate the values of these different FA isomers obtained with grass. In the table below are presented the characteristics of the flax seeds, the technological treatments implemented, the treated flax seeds and the results after 2 hours of incubation.

|  | Crushed raw flaxseed | Extruded cooked flaxseed | Flaxseed of the invention | Flaxseed oil | Reference grass |
|---|---|---|---|---|---|
| Characteristics of flax seeds ||||||
| Fat, % |  |  | 42.3 | 100 | 23.4 to 33.5 |
| Omega-3, % TFA |  |  | 59.3 | 55.6 | 58.8 |
| NDF, % |  |  | 16.9 | 0 | 55.1 to 62.6 |

-continued

|  | Crushed raw flaxseed | Extruded cooked flaxseed | Flaxseed of the invention | Flax-seed oil | Reference grass |
|---|---|---|---|---|---|
| Mucilages, g/kg |  | 3.7 |  | 0 | 0 |
| Water Retention Capacity (%) |  | 4.0 |  | — | — |
| HCN Flaxseed, mg/kg |  | 135 |  | 0 | 0 |
| AF flaxseed, % |  | 38.5 |  | 98.8 | — |
| Flaxseed treatment processes | | | | | |
| Mixing | No | No | No | — | — |
| Fractionation | Yes | Yes | Yes | — | — |
| Thermal preparation | | | | | |
| Temperature | — | — | 45° C. | — | — |
| Humidity | — | — | 11% | — | — |
| Duration | — | — | 15 min | — | — |
| Heat treatment | | | | | |
| Temperature | — | 90° C. | 135° C. | — | — |
| Duration | — | 15 s | 15 s | — | — |
| Pressure | — | 5 bars | 20 bars | — | — |
| Characteristics of treated flaxseeds | | | | | |
| HCN Flaxseed, mg/kg | 192 | 41 | <10 | | |
| AF flaxseed, % | 45 | 63 | 75.6 | | |
| Results | | | | | |
| % BH C18:3 | 33.0 | 36.5 | 34 to 40 | 32.8 | 81.3 |
| Becomes CLnA | 2.3 | 4.3 | 5 to 9 | 7.8 | 6.9 |
| Becomes C18:2 t11 c15 | 10.6 | 14.9 | 15 to 19 | 11.3 | 17.8 |
| % C18:1 t11 | 2.1 | 2.6 | 2.7 to 3.6 | 2.0 | 6.9 |
| C18:1 t11/C18:1 t10 | 2.4 | 3.0 | 3.5 to 4.1 | 2.6 | 3.9 |
| Becomes C18:0 | 27.7 | 19.1 | 10 to 20 | 23.8 | 53.6 |

% BH: biohydrogenation rate

The first observation is the very strong biohydrogenation of ALA from grass, leading in particular to a very high proportion of C18:0, compared with sources of ALA in the form of flax.

It can thus be considered that the amount of ALA to be distributed in the ruminant ration in the form of flax can be reduced compared with grass, to obtain a similar amount of ALA at the rumen exit, these ALAs that will have escaped biohydrogenation.

On the other hand, if we consider an equivalent amount of ALA intake in the form of grass or flax under these different forms, we see that:
  the crushed raw flaxseed has rapid hydrogenation kinetics leading to a very low proportion of hydrogenation intermediates, and a high proportion of C18:0. Note that the ratio C18:1 trans 11/C18:1 trans 10 is relatively low.
  the extruded cooked flaxseed allows a slowing of the hydrogenation kinetics of ALA, leading to more hydrogenation intermediates (CLnA and C18:2 trans 11 cis 15) and C18:0, as well as a higher proportion of C18:1 trans 11 and an improvement of the ratio C18:1 trans 11/C18:1 trans 10.
  Flaxseed oil also leads to a slowing of the hydrogenation kinetics of ALA, with some variants compared with extruded cooked flax seed as less C18:1 trans 11 and a deterioration of the ratio C18:1 trans 11/C18:1 trans 10.
  the flax seed resulting from the invention, according to the various treatment conditions mentioned, makes it possible to obtain a kinetics of appearance of the ALA hydrogenation intermediates similar to that of grass, with a proportion of C18:1 trans 11 closer to grass and a ratio C18:1 trans 11/C18:1 trans 10 similar to grass.

Its hydrogenation rate becomes higher than that of other flax sources and tends to be a little closer to that of grass. However, it remains far from it, but this difference is compensated by a lower synthesis of C18:0.

At the end of this study, it can be concluded that the flax seeds resulting from the invention are indeed the closest to the model of grass, it being understood that grass represents a natural, healthy and sustainable diet, in the interest of ruminants and their health, and in the interest of the consumer.

This study also confirmed that within the flaxseed assessed, available fat was a good predictor of rumen ALA fate.

4) Study of the Economic Interest of the Process According to the Present Invention In order to carry out this economic analysis, feed formulation software was used, with appropriate information on available raw materials, nutritional values of the raw materials, prices of these raw materials and nutritional constraints of feeds for broilers and layers at different physiological stages of production.

Thus, after having provided information on the nutritional values and potential prices of the best combinations of the invention, the predisposition of the invention to be economically viable was assessed.

By this same approach, it was also possible to evaluate the prices of interest of the raw materials developed from the best combinations of processes resulting from the invention. And from there, it was found that the invention made it possible to be economically relevant within the framework of a balanced diet in ALA omega-3, for example by formulating on formulation constraints linked to obligations of means in ALA omega-3 as in the specifications of the Bleu-Blanc-Cceur association.

Below are presented three feed formulas for growing broilers showing the economic favor given to the solution resulting from the invention (a mixture of flax and fava bean seeds, at a rate of 70% and 30% respectively, due to its technical-economic priority in terms of inclusion by optimization in the Bleu-Blanc-Cceur feed formulas, compared with the known raw materials of the prior art (crushed or extruded flax seeds).

Comparison table of three growth feed formulas for Blue-White-Cceur broiler chicken: one from crushed flaxseed, a second from extruded flaxseed and a last one from flax seeds from the invention.

|  | Control formula with crushed flax seed | Control formula with extruded flax seed | Trial formula with flax seeds of the invention |
|---|---|---|---|
| Composition of the formulas | | | |
| Soybean meal | 22.3 | 18.1 | 20.8 |
| Rapeseed cake | | | |
| Wheat | 39.5 | 62.5 | 53.4 |
| Corn | 24.5 | 3.7 | 11.9 |
| Crushed flaxseed | 3.2 | | |
| Extruded flaxseed | | 3.8 | |
| (70% flaxseed + 30% wheat bran) | | | |

-continued

|  | Control formula with crushed flax seed | Control formula with extruded flax seed | Trial formula with flax seeds of the invention |
|---|---|---|---|
| Solution of the invention (70% flaxseed + 30% beanseed) |  |  | 3.4 |
| Corn gluten | 3.6 | 5.0 | 3.6 |
| Rapeseed oil | 4 | 4 | 4 |
| Minerals & Vitamins | 2.3 | 2.3 | 2.3 |
| Amino acids | 0.6 | 0.6 | 0.6 |
| Nutritional characteristics ||||
| Metabolizable energy | 3100 kcal | 3100 kcal | 3100 kcal |
| Protein | 19.5% | 19.5% | 19.5% |
| Digestible lysine | 10.3 g/kg | 10.3 g/kg | 10.3 g/kg |
| Calcium | 0.79% | 0.79% | 0.79% |
| Phosphorus | 0.40% | 0.40% | 0.40% |
| ALA omega-3 | 6 g/kg | 6 g/kg | 6 g/kg |
| Cost price | 288.3 €/ton | 287.5 €/ton | 286.4 €/ton |

Through this formulation exercise, we can see that the solution of the invention is optimized in a growth feed formula for broiler chicken "Bleu-Blanc-Cœur", and allows savings of around 1.9 € per ton and 1.1 € per ton compared with crushed flaxseed and extruded flaxseed respectively.

This formulation study demonstrates the technical and economic viability of the invention for any nutritional approach balanced with ALA omega 3.

Finally, in terms of applications, the process constituting the subject matter of the invention aims to promote the inclusion of flax seeds in feed as a substitute for other sources of energy such as cereals and all lipid sources, and thus to meet the demands of breeders for healthy, high-performance animals, and the demands of consumers for access to livestock products which are more nutritionally balanced, safer, healthy and sustainable, and whose feed is of local origin.

The field of application of this process may concern two types of use for breeding:

Use in the Preparation of a Raw Material

Preparation of a concentrate based on flax seed, or co-products, becoming a raw material, for incorporation into complete or complementary feed for monogastric animals and intended for industrial and/or farm feed manufacturers. In this case, the minimum incorporation of said flaxseeds, or its co-products, is at least 20%, preferentially at least 30%, or even at least 40%.

The other raw materials making up the concentrate may undergo all or part of the steps of the present invention, especially if the latter confers an advantage on these raw materials.

Thus, the raw materials to be preferred are protein-rich seeds, any starchy product such as cereals, then cereal and protein crop co-products, oilseed cakes and sources of simple and complex carbohydrates, then any other raw materials usual in animal nutrition.

Use in the Preparation of a Foodstuff

Preparation of a complete or complementary cereal feed for livestock breeders to feed their monogastric animals. In this other case, the minimum incorporation of said flax seed, or its co-products, is a minimum of 1%, preferentially a minimum of 3%.

Also, the products resulting from the invention are distinguished according to the needs of food manufacturers and breeders, according to whether it is a question of a strict positioning of omega-3 intake without any other technical consideration, or according to whether it is a question of local, French and "Bleu Blanc Cœur" production channels, for example.

Indeed, in the case of omega-3 requirements traced and guaranteed to meet non-GMO or "Bleu-Blanc-Cœur" specifications, the treatment of flax seed, or its co-products, in association with protein-rich seed is preferred.

This approach has the advantage, in the context of use by food manufacturers, of being able to provide in the same product both a source of omega-3, but also a source of protein instead of a raw material support without much technical interest (co-products of cereals, grains, etc.), and thus not require an additional storage cell for protein-rich seeds.

Here is an example of formulations:
Formulas for non-GMO/local protein supply chains:
Based on 50% flax seeds and 50% protein-rich seeds;
Based on 30% flax seeds and 70% protein-rich seeds;
Based on 15% flax seeds and 85% protein-rich seeds;
   Formulas for the "Bleu-Blanc-Cœur" approach:
Based on 50% flax seeds and 50% protein-rich seeds;
Based on 70% flax seeds and 30% protein-rich seeds;
Based on 85% flax seeds and 15% protein-rich seeds.

The seeds, or co-products, resulting from the invention can also be used in domestic animals and ruminants. Although they were originally developed for feeding to monogastric animals, the seeds treated in accordance with the invention are fully usable in the feeding of domestic animals such as dogs and cats, and ruminants.

It is also interesting to use the seeds, and co-products, from the invention for feeding by pets. Flax seed prepared in this way provides a highly digestible source of omega-3 on the one hand, and a source of protein with reduced allergenic potential on the other. Indeed, due to the biochemical reactions at one of the thermal stages of the process, the skilled person knows that the allergen risk is significantly reduced (Franck et al., 2008).

Finally, the use of this process can also be extended to human food markets because of the added nutritional value and food safety it provides. This is in a context where omega-3 intake for humans is today expected to be increased in the diets of populations in developed countries, as recommended by Anses (Anses, 2011).

Below are details of the bibliographical references cited in this text:

Legrand, P., J. M. Bourre, B. Descomps, G. Durand and S. Renaud, 2001: Apports nutritionnels conseillés pour la population française—Lipides. In: E. T. Doc ed. Apports nutritionnels conseillés pour la population française.

Sauvant, D., J.-M. Perez, G. Tran, V. Bontems, P. Chapoutot, B. Doreau, C. Jondreville, S. J. Kaushik, M. Lessire, W. Martin-Rosset, F. Meschy, J. Noblet, J.-L. Peyraud, H. Rulquin and B. Seve, 2004: Tables de composition et de valeur nutritive des matières premières destinées aux animaux d'élevage.

Hylemond, P. B. (1985) Metabolism of bile acids in intestinal icroflora, in: DANIELSEN, H. & SJO¨VALL, J. (Eds) Sterols and Bile Acids: New Comprehensive Biochemistry, pp. 331-343 (Amsterdam, Elsevier Science).

Longstaff, M. & McNab, J. M. (1991) The inhibitory effects of hull polysaccharides and tannins of field beans (Vicia faba L.) on the digestion of amino acids, starch and lipid and on digestive enzyme activities in young chicks. British Journal of Nutrition, 65: 199-216

Noblet, J., Y. Jacquelin-Peyraud, B. Quemeneur and G. Chesneau, 2008: Valeur énergétique de la graine de lin chez le porc: impact de la technologie de cuisson-extrusion. Journées Rech. Porc. 40, 203-208.

Chesneau, G., S. Burban, F. Millet and P. Weill, 2009: Qualité du traitement des graines oléagineuses par cuisson-extrusion: matière grasse disponible. Renc. Rech. Rum. 16, 62-62.

AFNOR. NF EN 16160 Avril 2012. Aliments pour animaux—Dosage de l'acide cyanhydrique par CLHP—Aliments des animaux Ikeda, K. & Kusano, T. (1983) In vitro inhibition of digestive enzymes by indigestible polysaccharides. Cereal Chemistry, 60: 260-262

Bedford, M. R. Mechanism of action and practical environmental benefits from the use of feed enzymes. Anim. Feed Sci. Technol. 1995; 25:193-200.

Fengler, A. I. & Marquardt, R. R. (1988) Water-soluble pentosans from rye: II. Effects on rate of dialysis and on the retention of nutrients by the chick. Cereal Chemistry, 65:298-302

Choct, M., R. J. Hughes, J. Wang, M. R. Bedford, A. J. Morgan and G. Annison, 1996: Increased small intestinal fermentation is partly responsible for the anti-nutritive activity of non-starch polysaccharides in chickens. British poultry science 37, 609-621.

Elboutachfaiti, R., C. Delattre, A. Quéro, R. Roulard, J. Duchene, F. Mesnard and E. Petit, 2017: Fractionation and structural characterization of six purified rhamnogalacturonans type I from flaxseed mucilage. Food Hydrocolloids 62, 273-279.

Oomah, D. B., G. Mazza and E. O. Kenaschuk, 1996: Dehulling Characteristics of Flaxseed. LWT—Food Science and Technology 29, 245-250.

Oomah, B. D. and G. Mazza, 1997: Effect of Dehulling on Chemical Composition and Physical Properties of Flaxseed. Lebensm.-Wiss. u.-Technol. 30, 135-140.

Oomah, B. D. and G. Mazza, 1998: Fractionation of flaxseed with a batch dehuller. Ind. Crop. Prod. 9, 19-27.

Akande, K. E.; Doma, U. D.; Agu, H. O.; Adamu, H. M., 2010. Major antinutrients found in plant protein sources: their effect on nutrition. Pakistan J. Nutr., 9 (8): 827-832

Weill, P., 2001: Procédé de détoxification des graines de lin. In: Valorex ed. EP1155626 A1, France.

Meynard J.-M., Messéan A., Charlier A., Charrier F., Fares M., Le Bail M., Magrini M. B., Savini I., Réchauchère O., 2014, La diversification des cultures: lever les obstacles agronomiques et économiques, Éditions Quæ, 2014.

The invention claimed is:

1. A process for enhancing a food value of flax (*Linum usitatissimum*) seeds, comprising the following successive steps:
   a) selecting raw flax seeds comprising the following successive steps of:
      a1) providing raw flax seeds,
      a2) measuring in each batch of said seeds a hydrocyanic acid content, a fat content and an omega-3 fatty acid content and
      a3) selecting only each batch of said seeds that has:
         a content of cyanogenic compounds determined by an indirect method for assaying HCN after adding p-glucosidase according to the standard analysis method EN 16160 of April 2012 and corresponding to a hydrocyanic acid content (HCN content) of less than 250 mg per kilogram of raw flax seeds; and
         a fat content greater than 38 g per 100 g of raw flax seeds and
         an omega-3 fatty acid content higher than 20 g per 100 g of raw flax seeds and percent total fatty acids (TFAs) higher than 54;
   b) mixing, where there are at least two raw materials of different nature and/or quality, and then fractionating, or fractionating and then mixing, said seeds from step a) to break the seeds coats and kernels;
   c) impregnating the seeds from step b) with steam and/or a water-based liquid in order to reach on the seeds a temperature of 30 to 60° C. and a humidity of 10% to 60%, for 2 minutes to 8 hours;
   d) pressurizing the seeds or mixture from step c) for 10 seconds to 2 minutes at a minimum pressure of 10 bars at a temperature of 80° C. to 160° C.; or d1) heating the seeds or mixture from or step c) for 15 minutes to 2 hours at a temperature of 80° C. to 150° C.

2. The process as claimed in claim 1, wherein steps b) to d) or d1) are carried out on whole flax seeds.

3. The process as claimed in claim 1, wherein the temperature in step d1 is between 100° C. and 150° C.

4. The process as claimed in claim 1, comprising the addition of at least one exogenous enzyme to the seeds or mixture of step b), the at least one exogenous enzyme is identified from the following families: arabinofuranosidases, beta-glucanases, cellulases, glucoamylases, pectinases, pectin methyl esterases, phytases, proteases, and xylanases.

5. The process as claimed in claim 1, wherein step d), or d1) is interrupted as soon as said content of cyanogenic compounds determined by an indirect method for assaying HCN after adding β-glucosidase according to the standard analysis method EN 16160 of April 2012 and corresponding to HCN content of said seeds has a value lower than 30 mg/kg and their available fat (AF) content has a value higher than 65%.

6. The process as claimed in claim 1, wherein said seeds are for feeding of monogastric species and wherein a value for water retention capacity or mucilage content, as well as a content of crude cellulose or neutral detergent fiber (NDF), are lower than: for raw cellulose, 11 g per 100 g of raw flax seeds; for NDF, 22 g per 100 g of raw flax seeds; for mucilages, 4.5 g per kg of raw flax seeds; and with a water retention capacity of less than 4.5 g of water absorbed per g of dry raw flax seeds.

7. The process as claimed in claim 1, wherein in step c) the humidity is of more than 15% and the impregnation is for at least 15 minutes.

8. The process as claimed in claim 1, wherein the step c) is performed under stirring.

9. The process as claimed in claim 1, wherein step b) further comprises a step of mixing carried out after said fractionating.

10. The process as claimed in claim 1, wherein said fractionating of step b) is continued until at least 90% of the seeds have a grain size of less than 2000 micrometers.

11. The process as claimed in claim 1, wherein before or following step a) the seeds are sorted according to a criterion chosen from among size, weight, shape, density, an aerodynamic parameter, a colorimetric parameter, and an electrostatic parameter.

12. The process as claimed in claim 1, wherein following step a) and before step b) the seeds are decoated.

13. The process as claimed in claim 1, wherein following step a) or b), the seeds, whole or decoated, are crushed and the cake is used.

14. The process as claimed in claim 1, wherein at least one raw material selected from the group consisting of protein-rich seeds, cereals, cereal and protein co-products, simple and complex carbohydrate sources, oilseed cakes, and other oilseed co-products is mixed with said flax seeds.

15. The process as claimed in claim 1, wherein at least one antioxidant material is added to said seeds during at least one of said steps a) to d).

16. The process as claimed in claim 1, further comprising a step of cooling after step d), d1).

17. The process as claimed in claim 1, wherein following step a) and before step b) the seeds are decoated to produce kernel and coat fractions and the kernel fraction is characterized by a concentration of at least 3% fat.

18. The process as claimed in claim 1, wherein following step a) and before step b) the seeds are decoated to produce kernel and coat fractions and the kernel fraction is characterized by a concentration of at least 5% fat.

19. The process as claimed in claim 1, wherein following step a) or b) the seeds, whole or decoated, are crushed and a resulting cake contains at least 8% fat.

\* \* \* \* \*